(12) United States Patent
Tanaka et al.

(10) Patent No.: US 12,228,308 B2
(45) Date of Patent: Feb. 18, 2025

(54) FAN UNIT, FAN UNIT SYSTEM, AND AIR TREATMENT SYSTEM

(71) Applicant: DAIKIN INDUSTRIES, LTD., Osaka (JP)

(72) Inventors: Shuuichi Tanaka, Osaka (JP); Akira Komatsu, Osaka (JP); Toru Fujimoto, Osaka (JP); Yoshiteru Nouchi, Osaka (JP); Kouji Tatsumi, Osaka (JP); Ryouta Suzuki, Osaka (JP); Taishi Nakashima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/603,792

(22) PCT Filed: Apr. 15, 2020

(86) PCT No.: PCT/JP2020/016621
§ 371 (c)(1),
(2) Date: Oct. 14, 2021

(87) PCT Pub. No.: WO2020/213657
PCT Pub. Date: Oct. 22, 2020

(65) Prior Publication Data
US 2022/0214072 A1    Jul. 7, 2022

(30) Foreign Application Priority Data

Apr. 15, 2019 (JP) .................................. 2019-077305
Jun. 24, 2019 (JP) .................................. 2019-116144
Dec. 27, 2019 (JP) .................................. 2019-237836

(51) Int. Cl.
*F24F 3/00* (2006.01)
*F04D 25/16* (2006.01)
(Continued)

(52) U.S. Cl.
CPC ............ *F24F 3/001* (2013.01); *F04D 25/166* (2013.01); *F04D 27/004* (2013.01); *F24F 3/044* (2013.01);
(Continued)

(58) Field of Classification Search
None
See application file for complete search history.

(56) References Cited

U.S. PATENT DOCUMENTS 4,513,574 A    4/1985 Humphreys et al.
4,635,445 A    1/1987 Otsuka et al.
(Continued)

FOREIGN PATENT DOCUMENTS

CN    101769574 A    7/2010
CN    109163386 A    1/2019
(Continued)

OTHER PUBLICATIONS

International Preliminary Report on Patentability and English translation of the Written Opinion of the International Searching Authority for International Application No. PCT/JP2020/016621, dated Oct. 28, 2021.
(Continued)

*Primary Examiner* — Nathan L Laughlin
(74) *Attorney, Agent, or Firm* — Birch, Stewart, Kolasch & Birch, LLP

(57) ABSTRACT

A control load is reduced in a fan unit capable of controlling air flow volume. The rotation speed of a fan can be changed. An air flow volume detector detects air flow volume of the fan or equivalent air flow volume that is a physical quantity corresponding to the air flow volume of the fan. A unit casing houses, therein, the fan and the air flow volume detector. A fan controller, which is a controller, controls the rotation speed of the fan. The fan controller controls the
(Continued)

rotation speed of the fan on the basis of a command value of the air flow volume of the fan given from outside the unit and a detected value of the air flow volume or the equivalent air flow volume detected by the air flow volume detector.

9 Claims, 17 Drawing Sheets

(51) Int. Cl.
| | |
|---|---|
| F04D 27/00 | (2006.01) |
| F24F 3/044 | (2006.01) |
| F24F 11/77 | (2018.01) |
| F24F 11/84 | (2018.01) |
| F24F 11/86 | (2018.01) |
| F24F 11/89 | (2018.01) |
| F25B 49/02 | (2006.01) |
| F24F 110/30 | (2018.01) |
| F24F 110/40 | (2018.01) |

(52) U.S. Cl.
CPC .............. *F24F 11/77* (2018.01); *F24F 11/84* (2018.01); *F24F 11/86* (2018.01); *F24F 11/89* (2018.01); *F25B 49/022* (2013.01); *F24F 2110/30* (2018.01); *F24F 2110/40* (2018.01); *F25B 2313/0314* (2013.01); *F25B 2313/0315* (2013.01); *F25B 2700/21151* (2013.01); *F25B 2700/21152* (2013.01)

(56) References Cited

U.S. PATENT DOCUMENTS

| | | | |
|---|---|---|---|
| 4,693,175 | A | 9/1987 | Hashimoto |
| 4,921,164 | A | 5/1990 | Gotou et al. |
| 4,997,030 | A | 3/1991 | Goto et al. |
| 5,004,149 | A | 4/1991 | Narikiyo et al. |
| 5,025,638 | A | 6/1991 | Yamagishi et al. |
| 5,076,346 | A | 12/1991 | Otsuka |
| 5,179,524 | A | 1/1993 | Parker et al. |
| 5,230,719 | A | 7/1993 | Berner et al. |
| 5,305,953 | A | 4/1994 | Rayburn et al. |
| 5,344,069 | A | 9/1994 | Narikiyo |
| 5,417,077 | A | 5/1995 | Jeffery et al. |
| 5,417,368 | A | 5/1995 | Jeffery et al. |
| 5,701,750 | A | 12/1997 | Ray |
| 5,772,501 | A | 6/1998 | Merry et al. |
| 5,863,246 | A | 1/1999 | Bujak, Jr. |
| 5,979,167 | A | 11/1999 | Kochavi et al. |
| 6,601,168 | B1* | 7/2003 | Stancil .............. G06F 1/20 713/300 |
| 8,483,883 | B1 | 7/2013 | Watson |
| 8,814,639 | B1* | 8/2014 | Mecozzi ............. F04D 17/16 454/238 |
| 9,188,355 | B1* | 11/2015 | Allen .................. F24F 11/77 |
| 9,534,797 | B2 | 1/2017 | Tsutsumi |
| 11,614,244 | B2 | 3/2023 | Tanaka et al. |
| 2005/0087614 | A1 | 4/2005 | Ruise |
| 2005/0155367 | A1 | 7/2005 | Shah |
| 2006/0105697 | A1 | 5/2006 | Aronstam et al. |
| 2006/0116067 | A1 | 6/2006 | Federspiel |
| 2006/0234621 | A1 | 10/2006 | Desrochers et al. |
| 2007/0178823 | A1 | 8/2007 | Aronstam et al. |
| 2008/0242218 | A1 | 10/2008 | Asano et al. |
| 2010/0174414 | A1 | 7/2010 | Takagi et al. |
| 2010/0323604 | A1 | 12/2010 | Duffe |
| 2012/0192955 | A1 | 8/2012 | Dazai |
| 2012/0295530 | A1 | 11/2012 | Ikeno et al. |
| 2013/0265064 | A1* | 10/2013 | Hamann ............. G01N 17/04 324/700 |
| 2013/0281000 | A1 | 10/2013 | Newcomer |
| 2014/0273797 | A1 | 9/2014 | Jensen |
| 2015/0050876 | A1* | 2/2015 | Sakai .................. F24F 11/77 454/256 |
| 2015/0241076 | A1 | 8/2015 | Eguchi et al. |
| 2017/0023269 | A1 | 1/2017 | Gevelber |
| 2017/0219231 | A1 | 8/2017 | Hui |
| 2017/0299211 | A1 | 10/2017 | Kobayashi |
| 2017/0341094 | A1 | 11/2017 | Khalitov et al. |
| 2018/0045424 | A1 | 2/2018 | Yajima et al. |
| 2018/0100667 | A1 | 4/2018 | Komae et al. |
| 2018/0363933 | A1* | 12/2018 | Ross .................... F24F 11/77 |
| 2019/0024929 | A1 | 1/2019 | Funada et al. |
| 2019/0145642 | A1 | 5/2019 | Heigl |
| 2019/0331358 | A1* | 10/2019 | Ritmanich ............ F24F 11/46 |
| 2020/0011562 | A1 | 1/2020 | Turney et al. |
| 2020/0340485 | A1 | 10/2020 | Fessel et al. |
| 2020/0340704 | A1 | 10/2020 | Ross |
| 2021/0404695 | A1 | 12/2021 | Saito et al. |
| 2022/0412596 | A1 | 12/2022 | Ross |

FOREIGN PATENT DOCUMENTS

| | | |
|---|---|---|
| DE | 202018000922 U1 | 4/2018 |
| EP | 2781846 A1 | 9/2014 |
| GB | 2528642 A | 2/2016 |
| JP | 59-184033 U | 12/1984 |
| JP | 60-21653 U | 2/1985 |
| JP | 61-71840 U | 5/1986 |
| JP | 1-300135 A | 12/1989 |
| JP | 4-32634 A | 2/1992 |
| JP | 4-116329 A | 4/1992 |
| JP | 5-157278 A | 6/1993 |
| JP | 5-180501 A | 7/1993 |
| JP | 5-223328 A | 8/1993 |
| JP | 8-50597 A | 2/1994 |
| JP | 6-159770 A | 6/1994 |
| JP | 7-280330 A | 10/1995 |
| JP | 8-42909 A | 2/1996 |
| JP | 10-220853 A | 8/1998 |
| JP | 10-253132 A | 9/1998 |
| JP | 8-261545 A | 10/1998 |
| JP | 11-132489 A | 5/1999 |
| JP | 2001-304614 A | 10/2001 |
| JP | 2002-162067 A | 6/2002 |
| JP | 2002-372277 A | 12/2002 |
| JP | 2005-326106 A | 11/2005 |
| JP | 2008-51466 A | 3/2008 |
| JP | 2009-145004 A | 7/2009 |
| JP | 2009-186062 A | 8/2009 |
| JP | 2010-108359 A | 5/2010 |
| JP | 2010-181046 A | 8/2010 |
| JP | 2010-210216 A | 9/2010 |
| JP | 2011-52905 A | 3/2011 |
| JP | 2012-77968 A | 4/2012 |
| JP | 2012-141088 A | 7/2012 |
| JP | 2012-164596 A | 8/2012 |
| JP | 2012-225640 A | 11/2012 |
| JP | 5428322 B2 | 2/2014 |
| JP | 2014-92293 A | 5/2014 |
| JP | 2014-95541 A | 5/2014 |
| JP | 2015-206519 A | 11/2015 |
| JP | 2018-100791 A | 6/2018 |
| JP | 2018-155444 A | 10/2018 |
| JP | 2019-11884 A | 1/2019 |
| JP | 2019-49387 A | 3/2019 |
| KR | 10-1128574 B1 | 3/2012 |
| TW | M566801 U | 9/2018 |
| TW | I651493 B | 2/2019 |
| WO | WO 2017/159208 A1 | 9/2017 |
| WO | WO 2018/100657 A1 | 6/2018 |

OTHER PUBLICATIONS

International Search Report for PCT/JP2020/016621 mailed on Jun. 30, 2020.
U.S. Appl. No. 17/603,763, filed Oct. 14, 2021.
U.S. Appl. No. 17/603,785, filed Oct. 14, 2021.
U.S. Appl. No. 17/603,772, filed Oct. 14, 2021.
U.S. Appl. No. 17/603,691, filed Oct. 14, 2021.
U.S. Appl. No. 17/603,758, filed Oct. 14, 2021.

(56) References Cited

OTHER PUBLICATIONS

Extended European Search Report for European Application No. 19925110.9, dated May 9, 2022.
Extended European Search Report for European Application No. 20790587.8, dated Apr. 25, 2022.
Extended European Search Report for European Application No. 20790812.0, dated May 9, 2022.
Extended European Search Report for European Application No. 20791231.2, dated May 13, 2022.
Extended European Search Report for European Application No. 20791360.9, dated May 9, 2022.
Extended European Search Report for European Application No. 20794326.7, dated May 19, 2022.
Chinese Office Action and Search Report for Chinese Application No. 202080029089.8, dated Jun. 29, 2022, with English translation.
Tragon, "Mine Ventilation Technology and Air Conditioning" Coal Industry Press, 1st Edition, May 2014, pp. 93-95 (6 pages total).
Machine translation of JPH-07280330-A, published on Oct. 27, 1995.
Extended European Search Report for European Application No. 24159348.2, dated May 10, 2024.

\* cited by examiner

FAN UNIT, FAN UNIT SYSTEM, AND AIR TREATMENT SYSTEM

TECHNICAL FIELD

The present invention relates to a fan unit including a fan with variable rotation speed, a fan unit system including the fan unit, and an air treatment system including the fan unit.

BACKGROUND ART

Patent Literature 1 (JP 2001-304614 A) discloses a main air conditioner unit having a heat exchanger coil and a fan for sending air that has been subjected to heat exchange. Each fan unit of Patent Literature 1 is connected to a plurality of outlets through a duct and the air that has been subjected to heat exchange in the single main air conditioner unit is made to flow separately to the plurality of outlets and supplied into an air-conditioning zone.

A controller of Patent Literature 1 controls a pump motor of a pump unit that sends a heating medium from a heat source to the heat exchanger coil and can regulate the flow rate thereof and the rotational speed of a fan motor of the plurality of fan units. Sensors are provided in the plurality of outlets, and the controller controls the air flow volume of each fan and the flow rate of the heating medium of the heat exchanger coil in accordance with variations of the total numerical value of the blow-out air flow volume signals of the sensors.

SUMMARY OF THE INVENTION

Technical Problem

In the fan unit described in Patent Literature 1, one controller external to the plurality of fan units controls the rotational speed of the fan motor of the plurality of fan units. The controller of Patent Literature 1 controls the rotational speed of the fan motor of each fan unit while checking the blow-out air flow volume signals of the plurality of sensors provided in the plurality of outlets of each fan unit. This increases the control load on the controller of Patent Literature 1.

A fan unit whose air flow volume is controllable has a challenge of reducing the control load.

Solution to Problem

A fan unit according to a first aspect of the present invention includes a fan with variable rotation speed, an air flow volume detection unit, a unit casing, and a control unit. The air flow volume detection unit detects air flow volume of the fan or equivalent air flow volume that is a physical quantity corresponding to the air flow volume of the fan. The unit casing houses, therein, the fan and the air flow volume detection unit. The control unit controls the rotation speed of the fan. The control unit controls the rotation speed of the fan on the basis of a command value of the air flow volume of the fan given from outside the unit and a detected value of the air flow volume or the equivalent air flow volume detected by the air flow volume detection unit.

In the fan unit according to the first aspect of the present invention, the fan unit receives only the command value of the air flow volume, and the fan unit itself can automatically control the air flow volume. This allows the fan unit to reduce the control load, for example, simply by receiving the command value of the air flow volume appropriately from a main controller external to the fan unit.

A fan unit according to a second aspect of the present invention is the fan unit according to the first aspect of the present invention, and the control unit controls the rotation speed of the fan so that the air flow volume indicated in the detected value approaches the command value.

The fan unit according to the second aspect of the present invention easily implements automatic control of the air flow volume in the fan unit.

A fan unit according to a third aspect of the present invention is the fan unit according to the first or second aspect of the present invention, and the fan is a centrifugal fan. The centrifugal fan has a fan casing. The fan casing is housed in the unit casing.

The fan unit according to the third aspect of the present invention easily detects the air flow volume in a space that corresponds to the inside of the unit casing and also to the outside of the fan casing of the centrifugal fan, and easily performs control on the basis of the command value and the detected value of the air flow volume.

A fan unit according to a fourth aspect of the present invention is the fan unit according to any one of the first through third aspects, the air flow volume detection unit includes at least one of a wind speed sensor for detecting a wind speed at a predetermined location in the unit casing, a pressure sensor for detecting a static pressure in the unit casing, a differential pressure sensor for detecting a differential pressure at a predetermined location in the unit casing, and an air flow volume sensor for detecting air flow volume of the fan.

A fan unit according to a fifth aspect of the present invention is the fan unit according to any one of the first through fourth aspects of the present invention, and the control unit is associated with a remote controller. The command value is determined on the basis of an input of the remote controller.

The fan unit according to the fifth aspect of the present invention can appropriately change the air flow volume of the fan unit in accordance with the input of the remote controller.

A fan unit system according to a sixth aspect of the present invention includes the plurality of fan units according to any one of the first through fifth aspects of the present invention; and the main controller for sending the command value to the control unit of the fan unit.

An air treatment system according to a seventh aspect includes: the plurality of fan units according to any one of the first through fifth aspects; an air treatment unit connected to the plurality of fan units and configured to send treated air that has been subjected to predetermined treatment to the plurality of fan units; and the main controller for communicating with the air treatment unit and sending the command value to a control unit of the plurality of fan units.

DESCRIPTION OF EMBODIMENTS (1) Overall Configuration (1-1) Air Treatment System

Figure 1:
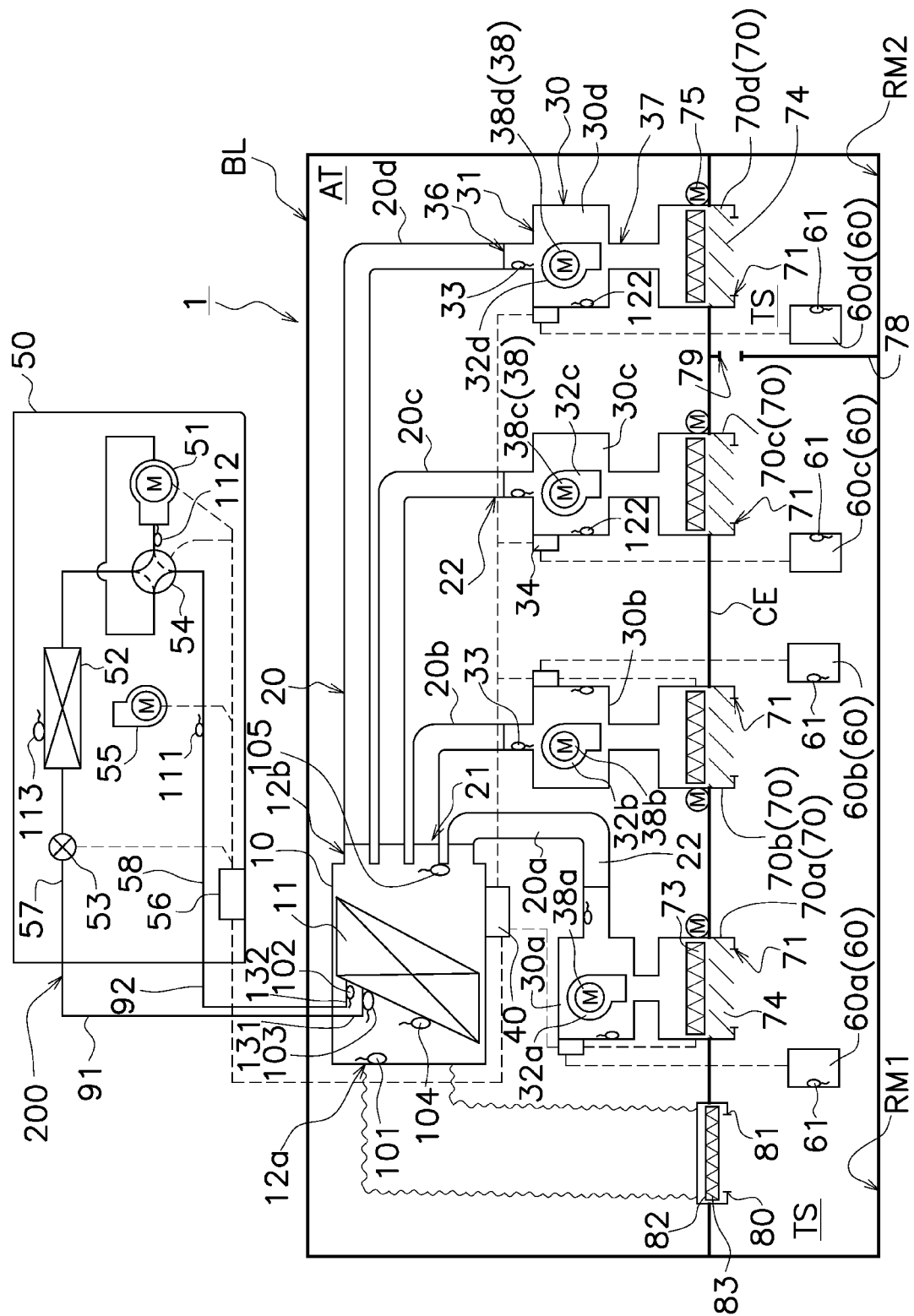
FIG. 1 is a schematic diagram showing an outline of the configuration of an air treatment system according to a first embodiment.
Figure 2:
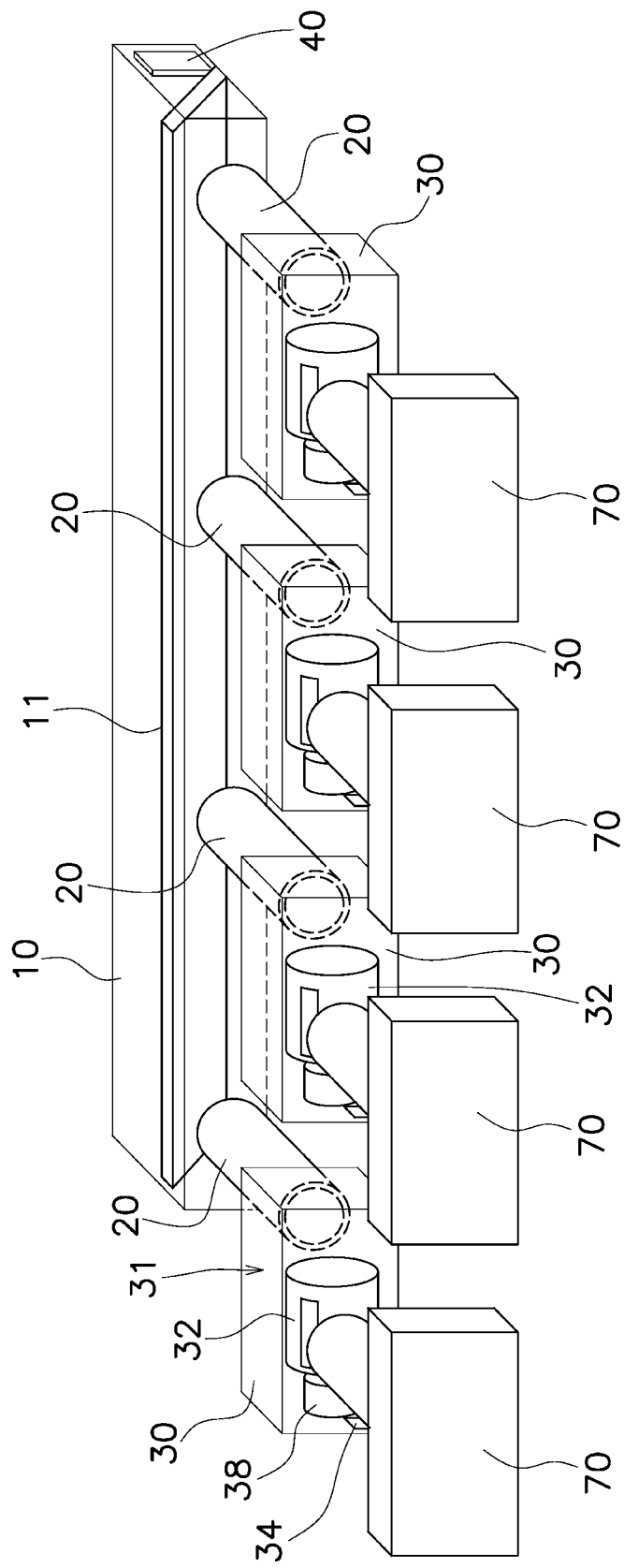
FIG. 2 is a schematic perspective view showing an example of connection of a heat exchanger unit, a duct, a fan unit, and a blower unit.

An air treatment system 1 shown in FIGS. 1 and 2 is a system that supplies conditioned air to an air conditioned space TS. The air treatment system herein is a system that applies predetermined treatment to air to be supplied to an air conditioned space. The predetermined treatment applied in the air treatment system includes filtering for removing dust particles from the air, changing air temperature, changing air humidity, filtering for removing predetermined chemical components from the air, and filtering for removing predetermined pathogens from the air. Examples of the dust particles include pollen, yellow sand, and PM 2.5. Examples of the predetermined chemical components include odorant. Examples of the pathogens include bacteria and viruses. The air treatment system 1 shown in FIGS. 1 and 2 is, in other words, an air conditioning system that changes the temperature of outdoor air and supplies air whose temperature has been changed to the air conditioned space TS.

Examples of the air conditioned space TS include rooms RM1 and RM2 of a building BL. The rooms RM1 and RM2 are partitioned by a partition 78 and separated from each other. Here, a case is described in which the air conditioned space TS is the two rooms RM1 and RM2, and the air treatment system 1 is adaptable to rooms of various sizes, shapes, and numbers. The air conditioned space TS to which the air treatment system 1 supplies the conditioned air is preferably surrounded by wall surfaces (front, back, top, bottom, left, and right), like the rooms RM1 and RM2. Note that the air conditioned space TS is not limited to the rooms RM1 and RM2, and may be, for example, a corridor, steps, and an entrance. The air conditioned space TS may be, for example, one space such as a large hall, or a plurality of independent spaces such as a plurality of rooms separated from one another.

Figure 3:
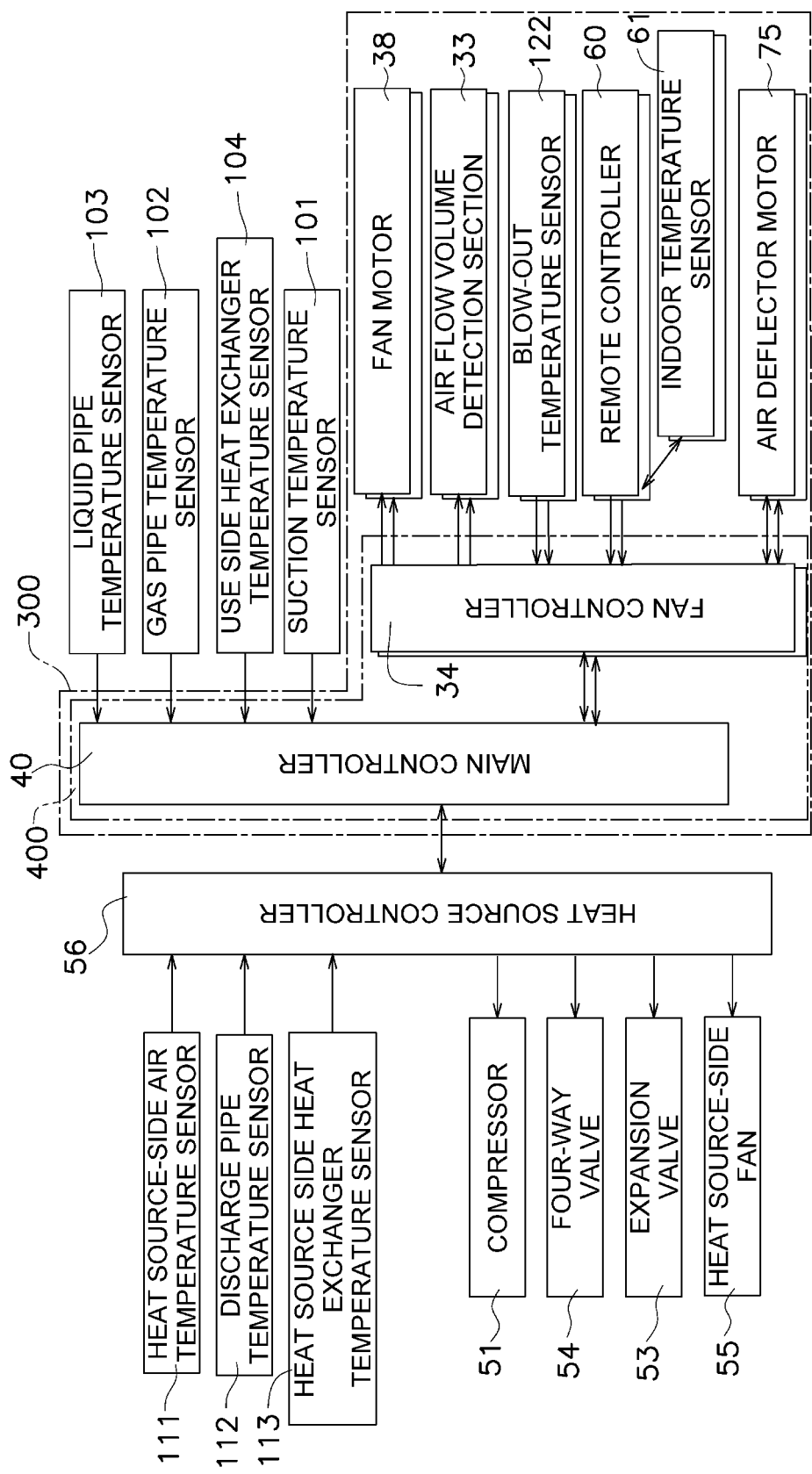
FIG. 3 is a block diagram showing an example of a control system.

As shown in FIG. 1, the air treatment system 1 includes a heat exchanger unit 10, a plurality of ducts 20, a plurality of fan units 30, and a controller 400 (see FIG. 3). The heat exchanger unit 10 is an air treatment unit.

The air treatment system 1 generates conditioned air through heat exchange in the heat exchanger unit 10 to supply the conditioned air thus generated to the air conditioned space TS through a plurality of distribution flow paths. Each of the plurality of ducts 20 is disposed in one of the plurality of distribution flow paths. The air treatment system 1 includes a plurality of openings 71 disposed in the air conditioned space TS so that the plurality of openings 71 correspond to the plurality of ducts 20. Each fan unit 30 supplies the conditioned air to the corresponding openings 71. Each of the plurality of fan units 30 is disposed in one of the plurality of distribution flow paths.

Note that the plurality of ducts 20 is sometimes distinguished from one another, such as a duct 20a, by giving alphabetic subscripts to the plurality of ducts 20. Here, four ducts 20a to 20d are shown as the ducts 20. Further, four fan units 30a to 30d are shown as the fan units 30. Further, four blower units 70a to 70d and remote controllers 60a to 60d are shown as a blower unit 70 and a remote controller 60, respectively. Each of the plurality of blower units 70a to 70d is disposed in one of the plurality of distribution flow paths.

The heat exchanger unit 10 includes a use side heat exchanger 11. The heat exchanger unit 10 has a function to change an air temperature through heat exchange in the use side heat exchanger 11. The air whose temperature has been changed by the use side heat exchanger 11 is the conditioned air. The heat exchanger unit 10 transfers heat between air sucked into and a refrigerant to blow out the conditioned air.

The plurality of ducts 20 has one end 21 connected to the heat exchanger unit 10. The plurality of ducts 20 is a plurality of pipes to send the conditioned air generated by the heat exchanger unit 10, and has a function to distribute the conditioned air. In other words, the plurality of ducts 20 serves to distribute the conditioned air that has passed through the use side heat exchanger 11 of the heat exchanger unit 10. The plurality of ducts 20 has other end 22 connected to the plurality of fan units 30, and the conditioned air sent from the ducts 20 is supplied through the fan unit 30 and the blower unit 70 to the air conditioned space TS.

The plurality of fan units 30 is connected to the other ends 22 of the plurality of ducts 20. Here, for example, one duct 20a connected to the heat exchanger unit 10 is connected to one corresponding fan unit 30a. Similarly, the fan units 30b to 30d are connected to the corresponding ducts 20b to 20d, respectively. A description is given of a case where each duct 20 has one end 21 and one other end 22; however, one duct 20 may be branched to have one end 21 and a plurality of other ends 22, and the fan units 30 may be connected to the plurality of other ends 22 thus branched, respectively. Further, the fan units 30a to 30d are connected to the blower units 70a to 70d and the remote controllers 60a to 60d, respectively.

In order to supply the conditioned air to the openings 71, the fan units 30 suck in the conditioned air from the heat exchanger unit 10 through the ducts 20. Each of the fan units 30 includes a fan 32 in a unit casing 31 thereof to suck in the conditioned air. The fan 32 sends air from the other end 22 of the duct 20 toward the opening 71. The number of fans 32 of each of the fan units 30 may be one or more. Here, fans 32a to 32d are provided in the unit casings 31 of the fan units 30a to 30d, respectively.

The fan units 30 are configured to change the amount of conditioned air supplied to the openings 71. The amount of air supplied is the amount of air supplied to the air conditioned space TS per unit time. Here, four fan motors 38a to 38d are configured to change the rotation speed individually. The fan motors 38a to 38d change the rotation speed individually, which enables the fan units 30a to 30d to change the amount of air supplied individually.

The controller 400 controls the plurality of fan units 30. More specifically, a main controller 40 of the controller 400 sends, to the plurality of fan units 30, a plurality of commands concerning the amount of air supplied. For example, the main controller 40 sends, to the fan units 30, a command value of the air flow volume of the fan units 30. The command value of the air flow volume may be, for example, a value of the air flow volume (CMH), a value of the wind speed (m/s) for the case where the cross-sectional area through which the air passes is known, or a static pressure (Pa), provided the relationship between the air flow volume and the static pressure is determined.

In addition to the configuration described above, the air treatment system 1 includes a heat source unit 50, the remote controller 60, the blower unit 70, a suction unit 80, and various sensors. Such sensors are preferably sensors corresponding to the command value of the air flow volume of the main controller 40, which simplifies the control. The sensors of the air treatment system 1 are detailed later. Further, a control system of the air treatment system 1 including the main controller 40 of the controller 400 is described later.

(2) Detailed Configuration (2-1) Heat Exchanger Unit 10

The heat exchanger unit 10 includes the use side heat exchanger 11, a hollow housing 12 for housing the use side heat exchanger 11 therein, and the main controller 40. The housing 12 has one air inlet 12a connected to a suction port 81 and a plurality of air outlets 12b connected to the plurality of ducts 20. Here, the case of one air inlet 12a is shown; however, a plurality of air inlets 12a may be provided. Further, the case where the suction port 81 is provided in the room RM is described herein; however, the suction port 81 may be provided outside the building BL, for example. In a case where the suction port 81 is provided outside the building BL, a flow path for exhausting air from the air conditioned space TS to the outside of the building BL is provided so that the air pressure in the air conditioned space TS is substantially constant regardless of the amount of air supplied.

The use side heat exchanger 11 is, for example, a fin-and-tube heat exchanger, and transfers heat between the refrigerant flowing in a heat transfer tube and air passing between the heat transfer fins. When air sucked in from the air inlet 12a passes through the use side heat exchanger 11, heat is transferred between the air and the refrigerant (heating medium) passing through the use side heat exchanger 11 to generate conditioned air. The conditioned air generated in the use side heat exchanger 11 is sucked into the ducts 20a to 20b from the air outlets 12b.

The heat exchanger unit 10 has no fan. The reason why the heat exchanger unit 10 can suck in air from the air inlet 12a is that a negative pressure is exerted inside the heat exchanger unit 10 in response to all the plurality of ducts 20 sucking in air from the plurality of air outlets 12b. As described above, since the heat exchanger unit 10 has no function to send out air, it is important to prevent backflow from the duct 20 to the heat exchanger unit 10. In order to prevent backflow of the conditioned air, for example, the static pressure at one end 21 (inlet) of all the ducts 20 is kept higher than the static pressure in the heat exchanger unit 10. Alternatively, in order to prevent backflow of the conditioned air, for example, in a case where both the fan unit 30 with the fan motor 38 driving and the fan unit 30 with the fan motor 38 stopped are present, the air flow path in which the fan unit 30 with the fan motor 38 stopped is disposed is closed.

The heat exchanger unit 10 is provided with an in-unit refrigerant pipe 131 connecting the use side heat exchanger 11 and a refrigerant connection pipe 91 and an in-unit refrigerant pipe 132 connecting the use side heat exchanger 11 and a refrigerant connection pipe 92. One inlet and outlet of the use side heat exchanger 11 is connected to the in-unit refrigerant pipe 131. The other inlet and outlet of the use side heat exchanger 11 is connected to the in-unit refrigerant pipe 132.

(2-2) Duct 20

The plurality of ducts 20 having a function to distribute the conditioned air connects the plurality of air outlets 12b of the heat exchanger unit 10 and the plurality of fan units 30. A case where the fan units 30 are directly connected to the blower units 70 is described herein; however, the ducts 20 may be disposed between the fan units 30 and the blower units 70 so that the fan units 30 and the blower units 70 are connected to each other by the ducts 20.

The duct 20 is, for example, a ventilation path with a rectangular or round cross section made of a steel plate or another material. The duct 20 may be a metal pipe having a fixed shape or a pipe made of a freely bendable material. Connecting such ducts 20 enables various arrangements of the heat exchanger unit 10, the plurality of fan units 30, and the plurality of blower units 70.

FIG. 2 is a perspective view conceptually showing the heat exchanger unit 10, the four fan units 30, and the four blower units 70 connected to one another in a ceiling room AT. Since it is easy to make the heat exchanger unit 10, the fan units 30, and the blower units 70 configured as described above thin, the heat exchanger unit 10, the fan units 30, and the blower units 70 may be disposed in a space under the floor of the rooms RM1 and RM2.

(2-3) Heat Source Unit 50

The heat source unit 50 supplies heat energy required for heat exchange of the use side heat exchanger 11 of the heat exchanger unit 10. In the air treatment system 1 shown in FIG. 1, a refrigerant circulates between the heat source unit 50 and the heat exchanger unit 10, and a vapor compression refrigeration cycle is performed. The heat source unit 50 and the heat exchanger unit 10 constitute a refrigeration cycle apparatus that performs the vapor compression refrigeration cycle. In the example shown in FIG. 1, the heat source unit 50 is placed outside the building BL and uses the outside air as a heat source; however, the installation location of the heat source unit 50 is not limited to the outside the building BL.

The heat source unit 50 includes a compressor 51, a heat source side heat exchanger 52, an expansion valve 53, a four-way valve 54, a heat source-side fan 55, a heat source controller 56, and in-unit refrigerant pipes 57 and 58. A discharge port of the compressor 51 is connected to a first port of the four-way valve 54, and a suction port of the compressor 51 is connected to a third port of the four-way valve 54. The compressor 51 compresses the refrigerant in a gas state (hereinafter, also referred to as a gas refrigerant) sucked in from the suction port or the refrigerant in a gas-liquid two-phase state to discharge the compressed refrigerant from the discharge port. The compressor 51 contains a compressor motor capable of changing the rotation speed (or an operating frequency) by inverter control, for example. The compressor 51 can change the discharge amount, per unit time, of the refrigerant to be discharged by changing the operating frequency.

The four-way valve 54 connects one inlet and outlet of the heat source side heat exchanger 52 to a second port and connects the in-unit refrigerant pipe 58 to a fourth port.

During a cooling operation, as indicated by a solid line, the four-way valve 54 causes the refrigerant to flow from the first port to the second port, and thereby sends the refrigerant discharged from the compressor 51 to the heat source side heat exchanger 52. During the cooling operation, the four-way valve 54 also causes the refrigerant to flow from the fourth port to the third port, and thereby sends the refrigerant flowing out of the use side heat exchanger 11 to the suction port of the compressor 51 through the in-unit refrigerant pipe 132, the refrigerant connection pipe 92, and the in-unit refrigerant pipe 58.

During a heating operation, as indicated by a broken line, the four-way valve 54 causes the refrigerant to flow from the first port to the fourth port, and thereby sends the refrigerant discharged from the compressor 51 to the use side heat exchanger 11 through the in-unit refrigerant pipe 58, the refrigerant connection pipe 92, and the in-unit refrigerant pipe 132. During the heating operation, the four-way valve 54 also causes the refrigerant to flow from the second port to the third port, and thereby sends the refrigerant flowing out of the heat source side heat exchanger 52 to the suction port of the compressor 51. The heat source side heat exchanger 52 is, for example, a fin-and-tube heat exchanger, and transfers heat between the refrigerant flowing in a heat transfer tube and air passing between the heat transfer fins.

The other inlet and outlet of the heat source side heat exchanger 52 is connected to one end of the expansion valve 53. The other end of the expansion valve 53 is connected to one inlet and outlet of the use side heat exchanger 11 through the in-unit refrigerant pipe 57, the refrigerant connection pipe 91, and the in-unit refrigerant pipe 131.

The heat source unit 50 and the heat exchanger unit 10 are connected to each other to constitute a refrigerant circuit 200. In the refrigerant circuit 200, during the cooling operation, the refrigerant flows in the order of the compressor 51, the four-way valve 54, the heat source side heat exchanger 52, the expansion valve 53, the use side heat exchanger 11, the four-way valve 54, and the compressor 51. Further, during the heating operation, in the refrigerant circuit 200, the refrigerant flows in the order of the compressor 51, the four-way valve 54, the use side heat exchanger 11, the expansion valve 53, the heat source side heat exchanger 52, the four-way valve 54, and the compressor 51.

(2-3-1) Circulation of Refrigerant During Cooling Operation

During the cooling operation, a gas refrigerant compressed by the compressor 51 is sent to the heat source side heat exchanger 52 through the four-way valve 54. The heat of the refrigerant is dissipated by the heat source side heat exchanger 52 to the air moved by the heat source-side fan 55, is decompressed and expanded by the expansion valve 53, and is sent to the use side heat exchanger 11 through the in-unit refrigerant pipe 57, the refrigerant connection pipe 91, and the in-unit refrigerant pipe 131. The refrigerant having a low temperature and low pressure sent from the expansion valve 53 to the use side heat exchanger 11 takes heat from the air sent from the suction port 81 through the heat exchange in the use side heat exchanger 11. The gas refrigerant or the gas-liquid two-phase refrigerant that has been subjected to the heat exchange in the use side heat exchanger 11 is sucked into the compressor 51 through the in-unit refrigerant pipe 132, the refrigerant connection pipe 92, the in-unit refrigerant pipe 58, and the four-way valve 54. The conditioned air whose heat has been transferred by the use side heat exchanger 11 is blown out to the rooms RM1 and RM2 through the plurality of ducts 20, the plurality of fan units 30, and the plurality of openings 71, which cools the rooms RM1 and RM2.

During the cooling operation, the heat source controller 56 adjusts, for example, the opening degree of the expansion valve 53 to match the degree of superheating of the refrigerant sucked into the suction port of the compressor 51 to a target value of the degree of superheating in order to prevent liquid compression in the compressor 51. The heat source controller 56 also controls the compressor 51 to change the operating frequency to handle the cooling load while adjusting the opening degree of the expansion valve 53. The degree of superheating is calculated, for example, by subtracting an evaporation temperature of the refrigerant in the use side heat exchanger 11 from the temperature of the gas refrigerant flowing out of the use side heat exchanger 11.

(2-3-2) Circulation of Refrigerant During Heating Operation

During the heating operation, a gas refrigerant compressed by compressor 51 passes through the four-way valve 54, the in-unit refrigerant pipe 58, the refrigerant connection pipe 92, and the in-unit refrigerant pipe 132 and is sent to the use side heat exchanger 11. The refrigerant is subjected to the heat exchange in the use side heat exchanger 11 and gives heat to the air sent from the suction port 81. The refrigerant that has been subjected to the heat exchange in the use side heat exchanger 11 passes through the in-unit refrigerant pipe 131, the refrigerant connection pipe 91, and the in-unit refrigerant pipe 57 and is sent to the expansion valve 53. The refrigerant having a low temperature and low pressure decompressed and expanded by the expansion valve 53 is sent to the heat source side heat exchanger 52, and absorbs heat from air moved by the heat source-side fan 55 through the heat exchange in the heat source side heat exchanger 52. The gas refrigerant or the gas-liquid two-phase refrigerant that has been subjected to the heat exchange in the heat source side heat exchanger 52 passes through the four-way valve 54 and is sucked into the compressor 51. The conditioned air given heat in the use side heat exchanger 11 passes through the plurality of ducts 20, the plurality of fan units 30, and the plurality of openings 71 to be blown out to the rooms RM1 and RM2, which heats the rooms RM1 and RM2.

During the heating operation, for example, the heat source controller 56 adjusts the opening degree of the expansion valve 53 so that the degree of subcooling of the refrigerant at the outlet of the use side heat exchanger 11 (in-unit refrigerant pipe 131) matches a target value. The heat source controller 56 also controls the compressor 51 to change the operating frequency to handle the heating load while adjusting the opening degree of the expansion valve 53. The degree of subcooling of the use side heat exchanger 11 is calculated, for example, by subtracting the temperature of the liquid refrigerant flowing out of the use side heat exchanger 11 from a condensation temperature of the refrigerant in the use side heat exchanger 11.

The blower unit 70 is mounted, for example, on a ceiling CE with the opening 71 facing downward. The case where the blower unit 70 is mounted on the ceiling CE is shown as an example herein. However, for example, the blower unit 70 may be mounted on the wall, and the location at which the blower unit 70 is mounted is not limited to the ceiling CE.

(2-4) Blower Unit 70

The blower unit 70 includes an air filter 73 in a hollow casing 72. The blower unit 70 blows out the conditioned air, sent from the fan unit 30, from the opening 71 through the air filter 73. The blower units 70a to 70d are thus connected to the fan units 30a to 30d, respectively. The case where the blower unit 70 includes the air filter 73 is described herein; however, the blower unit 70 may be configured without the air filter 73.

The blower unit 70 includes an air deflector 74 in the hollow housing 72. The blower unit 70 includes an air deflector motor 75 for driving the air deflector 74. The air deflector motor 75 rotates and moves the air deflector 74, which enables the air deflector 74 to adjust the airflow direction. Further, the air deflector 74 can move to a position at which the opening 71 is tightened up. The air deflector motor 75 is connected to, for example, a fan controller 34 of the fan unit 30. The fan controller 34 is thus a control unit that controls the airflow direction of the blower unit 70 and the opening and closing of the opening 71. The case where the blower unit 70 includes the air deflector 74 and the air deflector motor 75 is described herein; however, the blower unit 70 may be configured without the air deflector 74 and the air deflector motor 75. Another configuration is possible in which the main controller 40 controls the airflow direction of all the blower units 70 and the opening and closing of the opening 71.

The suction unit 80 is mounted on the ceiling CE of the building BL with the suction port 81 facing the air conditioned space TS, for example. The case where the suction unit 80 is mounted on the ceiling CE of the building BL is shown as an example herein; however, for example, the suction unit 80 does not have to be mounted on the ceiling CE of the building BL. For example, the location at which the suction unit 80 is mounted may be a wall of the building BL.

The suction unit 80 includes an air filter 83 in a hollow housing 82. The suction unit 80 takes in air to be sent to the heat exchanger unit 10 from the suction port 81 through the air filter 83. The case where the suction unit 80 includes the air filter 83 is described herein; however, the suction unit 80 may be configured without the air filter 83.

(2-5) Fan Unit 30

Figure 4:
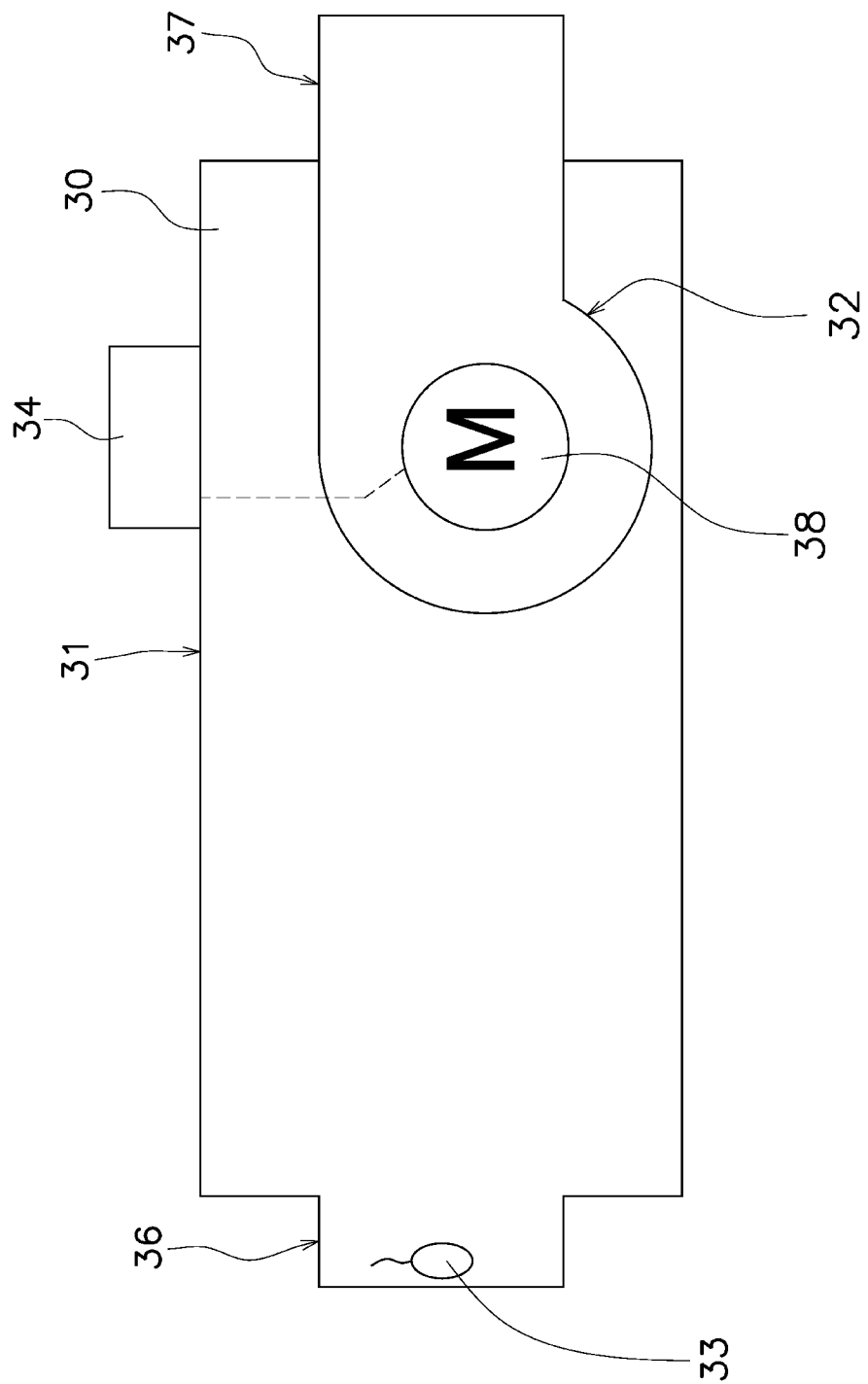
FIG. 4 is a schematic diagram showing an example of the configuration of a fan unit.

As shown in FIG. 4, each of the fan units 30 includes the unit casing 31, the fan 32, an air flow volume detection unit 33, and the fan controller 34. The fan unit 30 is one product in which the fan 32, the air flow volume detection unit 33, and the fan controller 34 are attached to the unit casing 31. Each unit casing 31 has an intake port 36 and an outlet 37. The unit casing 31 is a housing having a space of a predetermined shape through which air entering from the intake port 36 and exiting from the outlet 37 passes. The intake port 36 of each unit casing 31 is connected to the other end 22 of each duct 20. The outlet 37 of each unit casing 31 is connected to an outlet of each fan 32, and also connected to the corresponding blower unit 70. The conditioned air blown out from the fan 32 passes through the blower unit 70 and is blown out from the opening 71.

Figure 5:
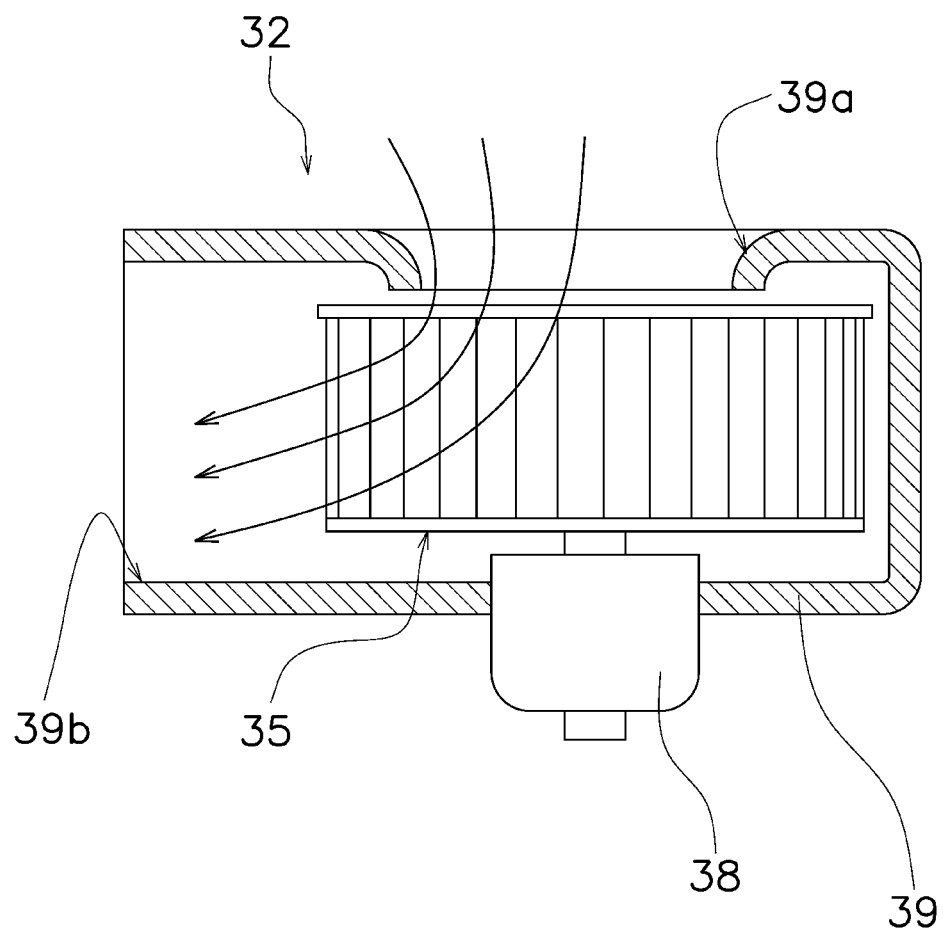
FIG. 5 is a schematic sectional view showing an example of a fan of a fan unit.

Each unit casing 31 houses, therein, the fan 32 and the air flow volume detection unit 33. The fan 32 includes a fan casing 39 (see FIG. 5). The rotation speed of each fan 32 can be changed. The fan 32 is fixed at a predetermined position in the unit casing 31, and an outlet 39b of the fan casing 39 is connected to the outlet 37 of the unit casing 31. An inlet 39a of the fan casing 39 is provided at a predetermined position of the internal space of the unit casing 31. For example, a centrifugal fan can be used as the fan 32. Examples of the centrifugal fan used as the fan 32 include a sirocco fan. FIG. 5 is a sectional view showing the sirocco fan as an example of the fan 32. The fan 32 houses a fan rotor 35 in the fan casing 39 so that the fan rotor 35 can rotate. The fan motor 38 rotates the fan rotor 35 of the sirocco fan. The rotation speed of the fan 32 can be rephrased as the rotation speed of the fan rotor 35. Increasing the rotation speed of the fan motor 38 increases the rotation speed of the fan rotor 35, so that the fan 32 increases the air flow volume. In addition, reducing the rotation speed of the fan motor 38 reduces the rotation speed of the fan rotor 35, so that the fan 32 reduces the air flow volume. Since the outlet of the fan 32 is connected to the outlet 37 of the unit casing 31, the air flow volume of the fan 32 matches the amount of air supplied from the opening 71. The fan 32 can, therefore, change the amount of air supplied by changing the rotation speed of the fan motor 38.

The fan controller 34 is attached to the unit casing 31. All the fan controllers 34 are connected to the main controller 40 herein. The fan controller 34 is connected to the fan motor 38, so that the fan controller 34 can control the rotation speed of the fan motor 38.

The air flow volume detection unit 33 of each fan unit 30 detects air flow volume of the fan 32 or equivalent air flow volume that is a physical quantity corresponding to the air flow volume of the fan 32. In detecting the air flow volume of the fan 32, the air flow volume detection unit 33 includes an air flow volume sensor. In detecting the equivalent air flow volume that is a physical quantity corresponding to the air flow volume of the fan 32, the air flow volume detection unit 33 includes, for example, a wind speed sensor, a differential pressure sensor, or a pressure sensor. In detecting the air flow volume with an air flow volume sensor, the air flow volume sensor is installed at a predetermined position in the unit casing 31. Since shapes and positions of the unit casing 31, the fan 32, the intake port 36, the outlet 37, and the air flow volume sensor are determined, a relationship between a measured value of the installed air flow volume sensor and the air flow volume of the fan 32 is checked by an experiment. The fan controller 34 stores, for example, a table showing the relationship between the measured value of the air flow volume sensor and the air flow volume of the fan 32.

Further, in detecting the wind speed as the equivalent air flow volume, the air flow volume detection unit 33 includes a wind speed sensor that detects a wind speed at a predetermined position in the unit casing 31. Since shapes and positions of the unit casing 31, the fan 32, the intake port 36, the outlet 37, and the wind speed sensor are determined, a relationship between a measured value of the installed wind speed sensor and the air flow volume of the fan 32 is checked by an experiment. The fan controller 34 stores, for example, a table showing the relationship between the measured value of the wind speed sensor and the air flow volume of the fan 32.

Further, in detecting the differential pressure as the equivalent air flow volume, the air flow volume detection unit 33 includes a differential pressure sensor that detects a difference between static pressures at two predetermined locations in the unit casing 31. Since shapes and positions of the unit casing 31, the fan 32, the intake port 36, the outlet 37, and the differential pressure sensor are determined, a relationship between a measured value of the installed differential pressure sensor and the air flow volume of the fan 32 is checked by an experiment. The fan controller 34 stores, for example, a table showing the relationship between the measured value of the differential pressure sensor and the air flow volume of the fan 32.

Further, in detecting the static pressure as the equivalent air flow volume, the air flow volume detection unit 33 includes a pressure sensor that detects a static pressure at a predetermined location in the unit casing 31. Since shapes and positions of the unit casing 31, the fan 32, the intake port 36, the outlet 37, and the pressure sensor are determined, a relationship between a measured value of the installed pressure sensor and the air flow volume of the fan 32 is checked by an experiment. The fan controller 34 stores, for example, a table showing the relationship between the measured value of the pressure sensor and the air flow volume of the fan 32.

Note that the method for determining the air flow volume on the basis of the measured value is not limited to the method of using the table for conversion to the air flow volume, and instead of the table, the fan controller 34 may be configured to, for example, use a relational expression showing the relationship between each parameter and the air flow volume to calculate the air flow volume on the basis of the measured value.

The fan controller 34 receives, from the main controller 40, a command value of the air flow volume of the fan 32. The fan controller 34 controls the rotation speed of the fan 32 on the basis of the command value of the air flow volume and a detected value of the air flow volume or the equivalent air flow volume detected by the air flow volume detection unit 33. The fan controller 34 controls, for example, the rotation speed of the fan 32 so that the air flow volume indicated in the detected value approaches the command value. Specifically, the fan controller 34 reduces the rotation speed of the fan 32 if the air flow volume indicated in the detected value is greater than the command value, and increases the rotation speed of the fan 32 if the air flow volume indicated in the detected value is smaller than the command value.

The fan controller 34 is associated with, for example, the remote controller 60. For example, in a case where a set temperature is inputted to the remote controller 60, the main controller 40 sends, to the fan controller 34 of the fan unit 30, a command value in accordance with the set temperature inputted to the remote controller 60. To that end, the main controller 40 determines the command value on the basis of the set temperature that is an input of the remote controller 60. For example, during the cooling operation, in a case where the set temperature of the remote controller 60 is higher than a room temperature detected by the remote controller 60, a command value is sent which is smaller than the command value for the case of the room temperature matching the set temperature. Conversely, during the cooling operation, in a case where the set temperature of the remote controller 60 is lower than the room temperature, a command value is sent which is larger than the command value for the case of the room temperature matching the set temperature. For example, in a case where the fan controller 34 which has received the command value for the case of the room temperature matching the set temperature receives a command value larger than that command value, the rotation speed of the fan 32 is increased to increase the air flow volume of the fan 32.

(2-6) Control System

As shown in FIG. 3, the main controller 40 is connected to the plurality of fan controllers 34 and the heat source controller 56. The heat source controller 56 includes, for example, various circuits provided on a printed wiring board connected to various devices of the heat source unit 50, and controls the various devices of the heat source unit 50 such as the compressor 51, the expansion valve 53, the four-way valve 54, and the heat source-side fan 55. The main controller 40 is also connected to the remote controllers 60 through the fan controllers 34. The remote controllers 60*a* to 60*d* correspond to the blower units 70*a* to 70*d* respectively, and are connected to the fan units 30*a* to 30*d* respectively. The case where the remote controller 60 is connected to the main controller 40 through the fan controllers 34 is described herein; however, the remote controller 60 may be directly connected to the main controller 40. Further, the case where the main controller 40, the plurality of fan controllers 34, the heat source controller 56, and the plurality of remote controllers 60 are connected by wire is shown herein; however, all or some of them may be connected by wireless communication.

The main controller 40 and the plurality of fan units 30 may be combined into one product as a set of fan unit systems 300 (see FIG. 3). In a case where the main controller 40 and the plurality of fan units 30 are provided as the fan unit system 300 as described above, the control program for the main controller 40 and the plurality of fan units 30 can be easily constructed in a factory or the like. This makes it easy to omit extra functions, which simplifies the system.

Each of the main controller 40, the plurality of fan controllers 34, the heat source controller 56, and the plurality of remote controllers 60 is implemented by, for example, a computer. The computer constituting the main controller 40, the plurality of fan controllers 34, the heat source controller 56, and the plurality of remote controllers 60 includes a control computing device and a storage device. The control computing device may be a processor such as a CPU or a GPU. The control computing device reads out a program stored in the storage device and performs predetermined image processing and computing processing in accordance with the program. Further, the control computing device can write an computing result to the storage device and read out information stored in the storage device in accordance with the program. However, the main controller 40, the plurality of fan controllers 34, the heat source controller 56, and the plurality of remote controllers 60 may be configured using an integrated circuit (IC) capable of performing control similar to that performed using a CPU and a memory. Examples of the IC herein include a large-scale integrated circuit (LSI), an application-specific integrated circuit (ASIC), a gate array, and a field programmable gate array (FPGA).

The heat exchanger unit 10 includes a suction temperature sensor 101, a gas pipe temperature sensor 102, a liquid pipe temperature sensor 103, and a use side heat exchanger temperature sensor 104. Note that, for example, these temperature sensors or a temperature sensor described later may be thermistors. The suction temperature sensor 101, the gas pipe temperature sensor 102, the liquid pipe temperature sensor 103, and the use side heat exchanger temperature sensor 104 are connected to the main controller 40, and detection results thereof are sent to the main controller 40. The suction temperature sensor 101 detects the temperature of air sucked in from the air inlet 12a. The gas pipe temperature sensor 102 detects the temperature of a refrigerant at one inlet and outlet of the use side heat exchanger 11 connected to the in-unit refrigerant pipe 132. The liquid pipe temperature sensor 103 detects the temperature of a refrigerant at the other inlet and outlet of the use side heat exchanger 11 connected to the in-unit refrigerant pipe 131. The use side heat exchanger temperature sensor 104 is mounted in the vicinity of the middle of a refrigerant flow path in the use side heat exchanger 11, and detects the temperature of a refrigerant in the gas-liquid two-phase state flowing through the use side heat exchanger 11. The main controller 40 uses a detected value of at least one of the suction temperature sensor 101, the gas pipe temperature sensor 102, the liquid pipe temperature sensor 103, and the use side heat exchanger temperature sensor 104 to determine a command concerning an increase or decrease in the amount of air supplied. Note that an air outlet temperature sensor 105 that detects the temperature of air that has just passed through the use side heat exchanger 11 may be provided.

The heat source unit 50 includes a heat source-side air temperature sensor 111, a discharge pipe temperature sensor 112, and a heat source side heat exchanger temperature sensor 113. The heat source-side air temperature sensor 111, the discharge pipe temperature sensor 112, and the heat source side heat exchanger temperature sensor 113 are connected to the heat source controller 56. The detection results of the heat source-side air temperature sensor 111, the discharge pipe temperature sensor 112, and the heat source side heat exchanger temperature sensor 113 are sent to the main controller 40 through the heat source controller 56. The heat source-side air temperature sensor 111 detects the temperature of airflow produced by the heat source-side fan 55 before passing through the heat source side heat exchanger 52. The discharge pipe temperature sensor 112 detects the temperature of the refrigerant discharged from the compressor 51. The heat source side heat exchanger temperature sensor 113 is mounted in the vicinity of the middle of a refrigerant flow path in the heat source side heat exchanger 52, and detects the temperature of a refrigerant in the gas-liquid two-phase state flowing through the heat source side heat exchanger 52.

The fan unit 30 includes the air flow volume detection unit 33 and a blow-out temperature sensor 122. The air flow volume detection unit 33 detects, for example, volume of air passing through the unit casing 31 of the fan unit 30. The air flow volume detection unit 33 is connected to the fan controller 34 and sends data on the detected value to the fan controller 34. Note that the air flow volume detection unit 33 may be configured to detect the airflow direction so that backflow can be detected. The blow-out temperature sensor 122 is installed in the unit casing 31 of each fan unit 30, for example, and detects the temperature of the conditioned air blown out from each fan unit 30. The case where the blow-out temperature sensor 122 is installed in the unit casing 31 is described herein; however, the installation location of the blow-out temperature sensor 122 may be another place, for example, may be inside the blower unit 70.

Each of the plurality of remote controllers 60 contains an indoor temperature sensor 61, and is configured to input a command to turn on and off the operation of the air treatment system 1 and/or the fan unit 30, switching between air-cooling and air-heating, and a set temperature. The set temperature can be inputted as a numerical value, for example. For example, a user uses an input button on the remote controller 60 to select cooling operation, set the set temperature at 28° C., and select medium airflow as the set air flow volume.

The main controller 40 calculates the amount of air supplied necessary to be blown out from each fan unit 30 on the basis of the blow-out temperature detected by each blow-out temperature sensor 122 and the set temperature, and sends a command value to the fan controller 34. Note that the case where the indoor temperature sensor 61 is contained in the remote controller 60 is described herein; however, the position at which the indoor temperature sensor 61 is provided is not limited to the remote controller 60. For example, a configuration is possible in which an indoor temperature sensor is present as a single independent device, and the main controller 40 receives a value of room temperature from the independent indoor temperature sensor.

Second Embodiment (3) Overall Configuration

The main controller 40 controls a plurality of actuators in accordance with a plurality of commands concerning the amount of air supplied by the plurality of fan units 30. This type of form is not limited to the form of the first embodiment. The air treatment system 1 in which the main controller 40 controls the plurality of actuators in accordance with a plurality of commands concerning the amount of air supplied by the plurality of fan units 30 may be configured as described in the second embodiment. In the air treatment system 1 of the second embodiment, the plurality of fan controllers 34, which is a plurality of sub controllers, receives a plurality of commands sent by the main controller 40. In the air treatment system 1 of the second embodiment, each of the plurality of fan controllers 34 controls at least one of the plurality of actuators on the basis of at least one of the plurality of commands.

Specifically, the following describes an example in which the air treatment system 1 of the second embodiment has the configuration shown in FIG. 1 as with the air treatment system 1 of the first embodiment. In the second embodiment, a case is described in which the air treatment system 1 shown in FIG. 1 changes the amount of air supplied with the fan motor 38 and the air deflector 74 is not involved in changing the amount of air supplied.

As with the main controller 40 of the first embodiment, the main controller 40 of the second embodiment calculates the amount of air supplied necessary to be blown out from each fan unit 30 on the basis of the blow-out temperature detected by each blow-out temperature sensor 122 and the set temperature. Specifically, for example, the main controller 40 calculates the amount of air supplied by each of the fan units 30a to 30d on the basis of the temperature difference between the indoor air temperature to be adjusted by each of the plurality of fan units 30a to 30d and the set temperature and the blowing temperature. The main controller 40 determines the calculated amount of air supplied (target air supply amount) of each of the fan units 30a to 30d as a command to be given to the fan units 30a to 30d.

The main controller 40 sends, to the plurality of fan controllers 34, the plurality of calculated amounts of air supplied as the target air supply amount. In other words, the main controller 40 sends a plurality of commands to the plurality of fan controllers 34 for controlling the fan units 30a to 30d. The main controller 40 sends, for example, to the fan controller 34 attached to the fan unit 30a, the target air supply amount of the fan unit 30a. The target air supply amount of the fan unit 30a is a command concerning the amount of air supplied by the fan unit 30. The fan controller 34 of the fan unit 30a controls the rotation speed of the fan motor 38a so as to bring the amount of air supplied closer to the target air supply amount. Similarly, the main controller 40 sends, to the fan controller 34 attached to the fan units 30b to 30d, the target air supply amount of the fan units 30b to 30d. The fan controller 34 of the fan units 30b to 30d controls the fan motors 38b to 38d so as to bring the amount of air supplied closer to the target air supply amount.

More specifically, each of the fan units 30a to 30d includes a differential pressure sensor as the air flow volume detection unit 33 that detects volume of air passing through the unit. Note that the air flow volume detection unit 33 is not limited to the differential pressure sensor. For example, the air flow volume detection unit 33 may be a wind speed sensor. For example, the fan controller 34 of the fan unit 30a compares the volume of air (amount of air supplied) passing through the fan unit 30a detected by the differential pressure sensor of the fan unit 30a with a target air flow volume (target air supply amount). In a case where the volume of the air passing through the fan unit 30a is smaller than the target air flow volume, the fan controller 34 of the fan unit 30a increases the rotation speed of the fan motor 38a and increases the air flow volume (amount of air supplied) of the fan unit 30a to bring the air flow volume closer to the target air flow volume. Conversely, in a case where the volume of the air passing through the fan unit 30a is greater than the target air flow volume, the fan controller 34 of the fan unit 30a reduces the rotation speed of the fan motor 38a and reduces the air flow volume (amount of air supplied) of the fan unit 30a to bring the air flow volume closer to the target air flow volume.

The case where the fan controller 34 is attached to the fan unit 30 is described herein. However, it is possible that the fan controller 34 is not attached to the fan unit 30.

Third Embodiment

(4) Overall Configuration

Figure 6:
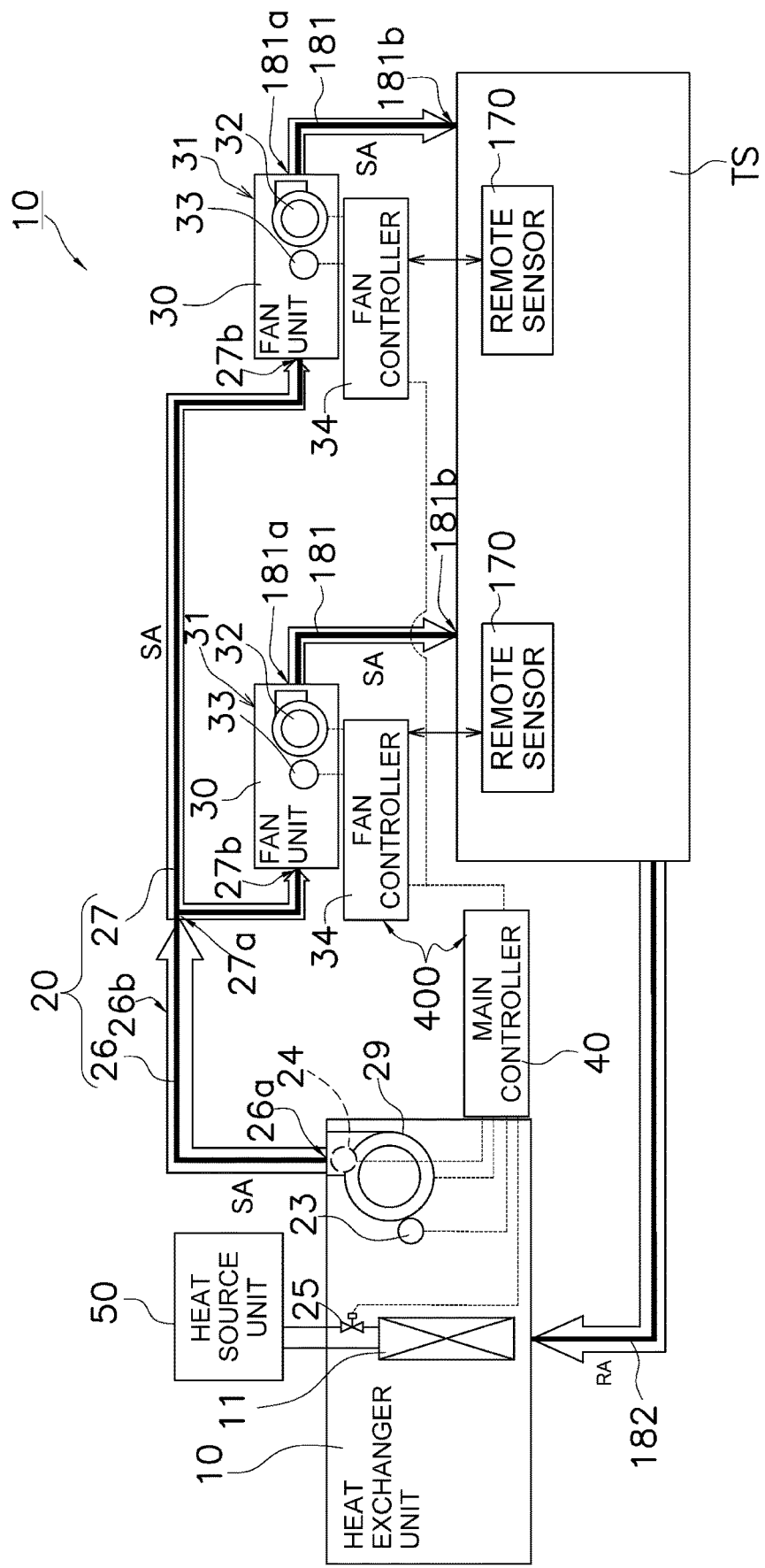
FIG. 6 is a conceptual diagram showing the configuration of an air conditioning system according to a third embodiment.

The air treatment system 1 shown in FIG. 6 includes the heat exchanger unit 10, the fan unit 30, the duct 20, and the controller 400. The heat exchanger unit 10 includes a blower 29. Each of a plurality of fan units 30 includes the fan 32.

Each fan 32 supplies air from the fan unit 30 to the air conditioned space TS. The air conditioned space TS is, for example, a room in a building. The room is, for example, a space in which air movement is limited by a floor, a ceiling, and a wall. The plurality of fan units 30 is disposed in one or more of the air conditioned spaces TS. FIG. 6 is a diagram showing an example in which, as a representative example of the air treatment system 1 including the plurality of fan units 30, the air treatment system 1 including two fan units 30 is disposed in one air conditioned space TS. The number of fan units 30 may be three or more, and is appropriately set. As described above, the number of air conditioned spaces TS in which the fan unit 30 is disposed may be two or more.

The duct 20 distributes air SA, sent out from the heat exchanger unit 10 by the blower 29, to the plurality of fan units 30. The duct 20 includes a main pipe 26 and a branch pipe 27 that branches off from the main pipe 26. FIG. 6 is a diagram showing a case where the main pipe 26 is disposed outside the heat exchanger unit 10; however, the main pipe 26 may be disposed in the heat exchanger unit 10 and may be disposed to extend from the inside of the heat exchanger unit 10 to the outside thereof. The case where the main pipe 26 is disposed in the heat exchanger unit 10 also includes a case where a part of a casing of the heat exchanger unit 10 functions as the main pipe 26. FIG. 6 is a diagram showing an example in which an inlet 26a of the main pipe 26 is connected to the heat exchanger unit 10. The blower 29 is disposed in the heat exchanger unit 10. Herein, all the air blown out from the blower 29 flows into the duct 20.

An outlet 26b of the main pipe 26 of the duct 20 is connected to an inlet 27a of the branch pipe 27. A plurality of outlets 27b of the branch pipe 27 is connected to the plurality of fan units 30.

Each fan unit 30 is connected to the air conditioned space TS by a ventilation path 181. An inlet 181a of the ventilation path 181 is connected to the fan unit 30. Each fan 32 produces airflow from the outlet 27b of the duct 20 toward the inlet 181a of the ventilation path 181 in the fan unit 30. This means, as viewed from another perspective, that each fan 32 draws air SA from the outlet 27b of the branch pipe 27. Each fan 32 can change the static pressure in each fan unit 30 (in front of the inlet 181a of the ventilation path 181) by changing the rotation speed. Assuming that the static pressure of the duct 20 is constant, each fan 32 can increase the static pressure in each fan unit 30 (in front of the inlet 181a of the ventilation path 181) by increasing the rotation speed. Increase in the static pressure in the fan unit 30 increases the amount of air SA flowing through the ventilation path 181. This change in amount of air flowing as described above changes supply air volume blown into the air conditioned space TS from the outlet 181b of each ventilation path 181.

The controller 400 includes the main controller 40 and the plurality of fan controllers 34. The main controller 40 and the plurality of fan controllers 34 are connected to one another to constitute the controller 400. The main controller 40 controls the rotation speed of the blower 29. In other words, the main controller 40 controls the output of the blower 29. If the output of the blower 29 increases, the state of the blower 29 changes so that amount of air blowing of the blower 29 increases.

One fan controller 34 is provided for each fan unit 30. Each fan controller 34 gives a command concerning change in air flow volume to the corresponding fan 32. Each fan controller 34 stores target air flow volume. Each fan controller 34 gives a command (command value of air flow volume) to increase the rotation speed of the fan 32 if the supply air volume is insufficient for the target air flow volume. Conversely, the fan controller 34 gives a command (command value of air flow volume) to reduce the rotation speed of the fan 32 if the supply air volume is excessive compared to the target air flow volume.

The controller 400 obtains information on the amount of air supplied to the air conditioned space TS from the plurality of fans 32. The information on the amount of air is, for example, the amount of air to be supplied to the air conditioned space TS per second, and the amount of air to be supplied is, in other words, necessary supply air volume. The required output of the blower 29 is determined on the basis of the obtained information on the amount of air. The controller 400 controls the output of the blower 29 to achieve the required output thus determined. Specifically, each fan controller 34 obtains information on the amount of air of the fan unit 30 from the corresponding fan unit 30. Each fan controller 34 outputs the information on the amount of air to the main controller 40.

(5) Detailed Configuration

(5-1) Heat Exchanger Unit 10

The heat exchanger unit 10 includes, in addition to the blower 29 described above, the use side heat exchanger 11, a use side air flow volume detection sensor 23, a use side air temperature sensor 24, and a water volume adjustment valve 25. The use side heat exchanger 11 is supplied with, for example, cold water or hot water as a heating medium from the heat source unit 50. The heating medium supplied to the use side heat exchanger 11 may be materials other than cold water or hot water, may be brine for example. The use side air flow volume detection sensor 23 may be, for example, an air flow volume sensor, a wind speed sensor, or a differential pressure sensor.

The use side air flow volume detection sensor 23 detects air flow volume of air sent out by the blower 29. The use side air flow volume detection sensor 23 is connected to the main controller 40. The value of the air flow volume detected by the use side air flow volume detection sensor 23 is sent from the use side air flow volume detection sensor 23 to the main controller 40. The air flow volume detected by the use side air flow volume detection sensor 23 is air flow volume of air flowing through the main pipe 26 of the duct 20. In other words, the air flow volume detected by the use side air flow volume detection sensor 23 is a total of supply air volume of air supplied from the plurality of fan units 30 to the air conditioned space TS.

The use side air temperature sensor 24 detects the temperature of the air SA sent from the blower 29 to the duct 20. The use side air temperature sensor 24 is connected to the main controller 40. The value of the temperature detected by the use side air temperature sensor 24 is sent from the use side air temperature sensor 24 to the main controller 40.

The heat exchanger unit 10 is connected through a ventilation path 182 to the air conditioned space TS. Air RA that has returned through the ventilation path 182 from the air conditioned space TS is sent out by the blower 29 to the duct 20 through the use side heat exchanger 11. When passing through the use side heat exchanger 11, the air RA exchanges heat with the cold water or the hot water flowing through the use side heat exchanger 11 to become conditioned air. The water volume adjustment valve 25 adjusts the amount of heat given to the air SA that has been subjected to the heat exchange in the use side heat exchanger 11 to be sent to the duct 20. The opening degree of the water volume adjustment valve 25 is controlled by the main controller 40. As the opening degree of the water volume adjustment valve 25 is increased, the amount of water flowing through the use side heat exchanger 11 increases, so that the amount of heat exchanged between the use side heat exchanger 11 and the air SA per unit time increases. Conversely, as the opening degree of the water volume adjustment valve 25 is reduced, the amount of water flowing through the use side heat exchanger 11 decreases, so that the amount of heat exchanged between the use side heat exchanger 11 and the air SA per unit time decreases.

(5-2) Fan Unit 30

As with the first embodiment, the fan unit 30 includes, in addition to the fan 32 described above, the unit casing 31 and the air flow volume detection unit 33. Since the configurations of the unit casing 31, the fan 32, and the air flow volume detection unit 33 of the fan unit 30 are similar to those of the first embodiment, the detailed description is omitted. The fan unit 30 is one product in which the fan 32 and the air flow volume detection unit 33 are attached to the unit casing 31. The air flow volume detection unit 33 detects the air flow volume of air sent out by the fan 32 or equivalent air flow volume that is a physical quantity corresponding to the air flow volume. Each air flow volume detection unit 33 is connected to one corresponding fan controller 34. The value of the air flow volume or the equivalent air flow volume detected by the air flow volume detection unit 33 is sent to the fan controller 34. The air flow volume or the equivalent air flow volume detected by the air flow volume detection unit 33 is the air flow volume of air flowing through the ventilation path 181. In other words, the air flow volume or the equivalent air flow volume detected by the air flow volume detection unit 33 is supply air volume of air supplied from each fan unit 30 to the air conditioned space TS. The air flow volume detection unit 33 may be, for example, an air flow volume sensor, a wind speed sensor, or a differential pressure sensor. The value detected by the air flow volume sensor is the value of the air flow volume, and the value of the wind speed detected by the wind speed sensor or the value of the differential pressure detected by the differential pressure sensor is the value of the equivalent air flow volume.

(5-3) Remote Sensor 170

A plurality of remote sensors 170 has a function of a temperature sensor. Each remote sensor 170 is configured to send data indicating the temperature of the air conditioned space TS to the corresponding fan controller 34.

(6) Operation of Air Treatment System 1

Each of the plurality of fan controllers 34 receives a value of the detected temperature of a target space from the remote sensor 170 connected thereto. Each fan controller 34 holds data indicating a set temperature. For example, data indicating a set temperature is sent in advance from a remote controller (not shown) or the like to each fan controller 34. Each fan controller 34 stores the data indicating a set temperature received from the remote controller or the like in a storage device 34b (see FIG. 7) such as a built-in memory. Each fan controller 34 sends a value of the set temperature to the main controller 40. The main controller 40 determines a target air flow volume of each fan unit 30 according to the temperature detected by the corresponding remote sensor 170 on the basis of the set temperature. The main controller 40 sends a value of the target air flow volume (command value of air flow volume) to each fan controller 34.

The main controller 40 determines the output of the blower 29 according to a total amount of the target air flow volume to be supplied to the air conditioned space TS.

For example, when a comparison is made between a case where the static pressure at the outlet 26b of the main pipe 26 (the inlet 27a of the branch pipe 27) takes an intermediate value between the static pressure at the inlet 26a of the main pipe 26 and the static pressure at the outlet 27b of the branch pipe 27 and a case where the static pressure at the outlet 26b of the main pipe 26 takes a value greater than the intermediate value, the ratio of the output of the blower 29 is greater than the ratio of the output of the plurality of fans 32 in the case where the static pressure at the outlet 26b of the main pipe 26 takes a value greater than the intermediate value. Conversely, when a comparison is made between the case where the static pressure at the outlet 26b of the main pipe 26 (the inlet 27a of the branch pipe 27) takes the intermediate value and a case where the static pressure at the outlet 26b of the main pipe 26 takes a value smaller than the intermediate value, the ratio of the output of the blower 29 is smaller than the ratio of the output of the plurality of fans 32 in the case where the static pressure at the outlet 26b of the main pipe 26 takes a value smaller than the intermediate value. There is an efficient range for the ratio of the output of the blower 29 to the output of the plurality of fans 32. The main controller 40 thus determines the output of the blower 29 so as to achieve an efficient ratio. In other words, it means that the main controller 40 determines the output of the blower 29 to a predetermined appropriate output for the total target air flow volume.

For example, considering the following method of determining the output of the blower 29, it can be seen that the output of the blower 29 has a range of the output of the blower 29 that is suitable for reducing the power consumption. If the output of the blower 29 is increased and the total power consumption of the blower 29 and the plurality of fans 32 rises, the output of the blower 29 is gradually reduced, and if the total power consumption of the blower 29 and the plurality of fans 32 is determined to be the output of the blower 29 before starting to rise again, the range of the output thus determined is a range in which the power consumption is smaller than the other ranges. Conversely, if the output of the blower 29 is reduced and the total power consumption of the blower 29 and the plurality of fans 32 rises, the output of the blower 29 is gradually increased, and if the total power consumption of the blower 29 and the plurality of fans 32 is determined to be the output of the blower 29 before starting to rise again, the range of the output thus determined is a range in which the power consumption is smaller than the other ranges. If the output of the blower 29 is increased and the total power consumption of the blower 29 and the plurality of fans 32 falls, the output of the blower 29 is gradually increased, and if the total power consumption of the blower 29 and the plurality of fans 32 is determined to be the output of the blower 29 before starting to rise again, the range of the output thus determined is a range in which the power consumption is smaller than the other ranges. Conversely, if the output of the blower 29 is reduced and the total power consumption of the blower 29 and the plurality of fans 32 falls, the output of the blower 29 is gradually reduced, and if the total power consumption of the blower 29 and the plurality of fans 32 is determined to be the output of the blower 29 before starting to rise again, the range of the output thus determined is a range in which the power consumption is smaller than the other ranges. However, determining the appropriate output of the blower 29 is not limited to such methods.

After the main controller 40 determines the target air flow volume and sends a value of the target air flow volume (command value of air flow volume) to each fan controller 34, each fan unit 30 other than the fan unit 30 with the highest fan efficiency is subjected to adjustment to the rotation speed of the fan 32 by the corresponding fan controller 34. The rotation speed of the plurality of fans 32 is adjusted independently of one another. At this time, the rotation speed of the fan 32 of the fan unit 30 with the highest fan efficiency is maximized in the determined output of the blower 29. Here, the fan unit 30 with the highest fan efficiency is the fan unit 30 with the lowest energy consumption for a case where the static pressure at the inlet 27a of the branch pipe 27 is the same and the supply air volume supplied to the air conditioned space TS is the same. Further, the fan unit 30 with the lowest fan efficiency is the fan unit 30 with the highest energy consumption for a case where the static pressure at the inlet 27a of the branch pipe 27 is the same and the supply air volume supplied to the air conditioned space TS is the same.

Each fan controller 34 controls the rotation speed of each fan 32 so that the supply air volume matches the target air flow volume. The plurality of fan controllers 34 controls the rotation speed of the plurality of fans 32 independently of one another. Each fan controller 34 increases the rotation speed of each fan 32 if the air flow volume detected by the air flow volume detection unit 33 is smaller than the target air flow volume. Each fan controller 34 reduces the rotation speed of each fan 32 if the air flow volume detected by the air flow volume detection unit 33 is larger than the target air flow volume. If the rotation speed of the fan unit 30 with the highest fan efficiency decreases, the main controller 40 changes the output of the blower 29 to adjust the rotation speed of the fan unit 30 with the highest fan efficiency to the maximum.

In changing the air flow volume, when changing the operating state of at least one second fan among the plurality of fans 32 or the air flow volume of at least one fan 32 among the plurality of fans 32, the main controller 40 gives priority to increasing the output of a fan with high fan efficiency or reducing the output of a fan with low fan efficiency among the blower 29 and the plurality of fans 32. In other words, the main controller 40 determines the output of the blower 29 and the target air flow volume of the plurality of fan units 30 so as to increase the output of the fan with high fan efficiency among the blower 29 and the plurality of fans 32 in order to increase the supply air volume to the air conditioned space TS.

Conversely, the main controller 40 determines the output of the blower 29 and the target air flow volume of the plurality of fan units 30 so as to reduce the output of the fan with high fan efficiency among the blower 29 and the plurality of fans 32 in order to reduce the supply air volume to the air conditioned space TS.

However, the main controller 40 increases the output of the blower 29 if the air flow volume of the fan unit with the maximum fan efficiency among the plurality of fan units 30 does not reach the target air flow volume. At this time, the main controller 40 increases the output of the blower 29 and keeps the rotation speed of the fan 32 of the fan unit 30 with the maximum fan efficiency at the maximum.

(7) Characteristics 7-1

In the air treatment system 1 described above, each fan unit 30 receives only a command value of air flow volume, and the fan controller 34 as the control unit automatically controls the air flow volume of the fan unit 30 itself. For example, if the fan controller 34 is given only a command value of air flow volume from the outside of the fan unit 30, e.g., the main controller 40, the fan unit 30 can control the air flow volume in accordance with the command value. As a result, in a case where the temperature of the conditioned air changes, the room temperature changes, the set value changes, or the like, the fan controller 34 of the fan unit 30 can omit the control operation for appropriately determining the air flow volume or the like, so that the fan unit 30 can reduce the control load.

7-2

The fan controller 34, which is a control unit of each fan unit 30, controls the rotation speed of the fan 32 so that the air flow volume indicated in the detected value approaches the command value. Controlling the rotation speed of the fan 32 so that the air flow volume indicated in the detected value approaches the command value means, for example, increasing the rotation speed of the fan 32 if the detected value of the air flow volume detection unit 33 is lower than the command value, and conversely, reducing the rotation speed of the fan 32 if the detected value is higher than the command value. As described above, the fan unit 30 that controls the rotation speed of the fan 32 such that the air flow volume indicated in the detected value approaches the command value easily implements automatic control of the air flow volume in the fan unit 30.

7-3

The fan 32 is a centrifugal fan, and the fan casing 39 is housed in the unit casing 31. The air flow volume is easily detected in a space inside the unit casing 31 and outside the fan casing 39 of the centrifugal fan. Therefore, the centrifugal fan facilitates control on the basis of the command value and the detected value of the air flow volume.

7-4

The fan controller 34 of the fan unit 30 is associated with the remote controller 60. A command value given to the fan controller 34 is determined on the basis of an input of the remote controller 60. Determining on the basis of an input of the remote controller 60 means that the input of the remote controller 60 is, for example, a parameter of a command value. In the first embodiment, the description takes an example where the command value is determined on the basis of the set temperature inputted by the remote controller 60 and the room temperature. Thus, the air flow volume of the fan unit 30 can be appropriately changed in accordance with the input of the remote controller 60.

(8) Modification to the First Embodiment (8-1) Modification 1A

In the first embodiment, the description is given of the case where the duct 20 is directly connected to the heat exchanger unit 10; however, the duct 20 may be indirectly connected to the heat exchanger unit 10. For example, a configuration is possible in which an attachment having a plurality of air outlets for connecting the duct 20 to the heat exchanger unit 10 is mounted between the duct 20 and the heat exchanger unit 10. Preparing a plurality of types of attachments that is different in numbers of connectable ducts 20 makes it possible to change the number of ducts 20 connectable to the heat exchanger unit 10 of the same model.

(8-2) Modification 1B

In the first embodiment, the description is given of the case where one blower unit 70 is connected to one fan unit 30; however, a plurality of blower units 70 may be connected to one fan unit 30. This means that a plurality of openings 71 may be provided in one fan unit 30. In such a case, a plurality of remote controllers 60 may be connected to each fan unit 30, for example, one remote controller 60 may be provided for each blower unit 70.

(8-3) Modification 1C

In the first embodiment, the description is given of the case where a vent hole 79 is provided on the wall between the rooms RM1 and RM2 and only one suction port 81 is provided. However, the number of suction ports 81 is not limited to one, and may be plural. Further, for example, a plurality of suction ports 81 may be provided in the same room RM1, or may be provided in both different rooms RM1 and RM2. In a case where the suction port 81 is provided in each of the rooms RM1 and RM2, the vent hole 79 does not need to be provided.

(8-4) Modification 1D

The fan unit 30 connected to the other end 22 of the duct 20 with one end 21 connected to the heat exchanger unit 10 may be connected to yet another duct 20 and another fan unit 30. For example, a plurality of fan units 30 may be connected in series to one distribution flow path. One example of such a connection configuration is to connect two ducts 20, two fan units 30, and one blower unit 70 in series in the order of the duct 20, the fan unit 30, the duct 20, the fan unit 30, and the blower unit 70 from the heat exchanger unit 10. Providing a plurality of power sources in one distribution flow path makes it possible to set a distance between the heat exchanger unit 10 and the opening 71 to be longer than a case where only one identical power source is provided.

(8-5) Modification 1E

In the first embodiment, the description is given of the case where one heat exchanger unit 10 is connected to one heat source unit 50; however, the connection configuration between the heat source unit 50 and the heat exchanger unit 10 is not limited thereto. For example, a plurality of heat exchanger units 10 may be connected to one heat source unit 50. Alternatively, a plurality of heat source units 50 may be connected to the plurality of heat exchanger units 10. In these connection configurations, the heat exchanger unit 10 may be provided with a flow rate adjusting device for adjusting the flow rate of the refrigerant flowing through the use side heat exchanger 11. An example of such a flow rate adjusting device is a flow rate adjusting valve capable of changing an opening degree.

(8-6) Modification 1F

In the first embodiment, the description is given of the case where the compressor 51 of the heat source unit 50 is of a type capable of changing the rotation speed. However, the compressor 51 of the heat source unit 50 may be of a type incapable of changing the rotation speed.

(8-7) Modification 1G

In the first embodiment, the description is given of the case where the air treatment system 1 is configured to switch between the cooling operation and the heating operation. However, the technical concept of the first embodiment is applicable to an air conditioning system for cooling or heating only.

(8-8) Modification 1H

In the first embodiment, the description is given of the case of the refrigeration cycle apparatus in which the heat source unit 50 and the heat exchanger unit 10 are connected to each other to flow the refrigerant through the use side heat exchanger 11; however, the heat source unit 50 is not limited to the configuration in which the heat exchanger unit 10 is connected to constitute the refrigeration cycle apparatus. The heat source unit that supplies heat energy to the use side heat exchanger 11 may be configured to supply a heating medium such as hot water and/or cold water.

In the configuration of flowing the heating medium through the use side heat exchanger 11 as described above, a flow rate adjusting device for adjusting the flow rate of the heating medium flowing through the use side heat exchanger 11 may be provided in the heat exchanger unit 10.

Further, in a case where the heat exchanger unit 10 is connected to the heat source unit for suppling such a heating medium, a plurality of heat exchanger units 10 may be connected to one heat source unit.

(8-9) Modification 1I

In the first embodiment, the description is given of the case where, at startup, the main controller 40 requests the calculated total air flow volume of air passing through the use side heat exchanger 11 and a refrigerant circulation rate necessary for the refrigerant circuit 200 calculated on the basis of the calculated temperature of air sucked into the heat exchanger unit 10. However, the method for determining the necessary refrigerant circulation rate requested by the main controller 40 is not limited to the method described above.

For example, the air treatment system 1 may be configured as follows. At startup, the main controller 40 calculates total air flow volume of air that passes through the use side heat exchanger 11 by summing the amount of air supplied from all the fan units 30. The main controller 40 stores, in an internal memory, for example, an air flow volume table indicating a relationship between the total air flow volume and the necessary refrigerant circulation rate. The main controller 40 selects air flow volume closest to the calculated total air flow volume from among air flow volumes indicated in the air flow volume table. The main controller 40 requests the heat source controller 56 to supply a refrigerant circulation rate corresponding to the total air flow volume selected in the air flow volume table. The air treatment system 1 may be configured such that the main controller 40 gives, to the fan controller 34, a command (command value of air flow volume) to cause the plurality of fan units 30 to change the amount of air supplied corresponding to the difference (command value of air flow volume) between the air flow volume selected in the air flow volume table and the total air flow volume.

Further, for example, the air treatment system 1 may be configured as follows. At startup, the main controller 40 receives a set temperature of the remote controller 60 through the fan controller 34. Further, the main controller 40 receives an indoor air temperature detected by the remote controller 60, an indoor air temperature calculated on the basis of a detected value of the suction temperature sensor 101, or an indoor air temperature from an indoor temperature sensor capable of sending an indoor air temperature to the main controller 40. The main controller 40 calculates the entire air conditioning load of the air treatment system 1 on the basis of the received set temperature and indoor air temperature. The main controller 40 calculates total air flow volume and a necessary refrigerant circulation rate on the basis of the calculated air conditioning load. The main controller 40 calculates an amount of air supplied by each fan unit 30 on the basis of a product of the total air flow volume and the ratio of the air conditioning load of each fan unit 30, and gives a command (command value of air flow volume) to the plurality of fan controllers 34. The air treatment system 1 may be so configured that each fan controller 34 makes its own adjustment according to the amount of air supplied instructed by the main controller 40.

(8-10) Modification 1J

In the first embodiment, the description is given of the case where the main controller 40 of the air treatment system 1 mainly determines total air flow volume and performs control so as to follow the conditions related to the refrigerant of the heat source unit 50 to the total air flow volume. However, the air treatment system 1 may be so configured that, conversely, the conditions related to the refrigerant of the heat source unit 50 are mainly determined and the total air flow volume is determined so as to follow the conditions.

For example, the air treatment system 1 is so configured that the heat source controller 56 controls an operating frequency of the compressor 51 and/or an opening degree of the expansion valve 53. In the air treatment system 1 configured as described above, the heat source controller 56 keeps track of information on the total air flow volume of air currently passing through the use side heat exchanger 11. The heat source controller 56 informs the main controller 40 that the air flow volume needs to be increased or decreased with respect to the current total air flow volume on the basis of the information on the operating frequency of the compressor 51 and/or the valve opening degree of the expansion valve 53. The main controller 40 receives a command to increase or decrease the air flow volume from the heat source controller 56, calculates at what rate is appropriate to increase or decrease the air flow volume of each fan unit 30 in order to control the energy of the entire system, and gives a command (command value of air flow volume) to the plurality of fan units 30.

(8-11) Modification 1K

In the air treatment system 1 of the first embodiment, a refrigerant circulation rate in the refrigerant circuit 200 is adjusted by changing an operating frequency of the compressor 51. Controlling the refrigerant circulation rate in the air treatment system 1 is, however, not limited to the control over the operating frequency of the compressor 51. For example, the control is possible in such a manner that the refrigerant circulation rate of the refrigerant circuit 200 is adjusted by adjusting a valve opening degree of the expansion valve 53 together with the operating frequency of the compressor 51 or by adjusting the opening degree of the expansion valve 53.

(8-12) Modification 1L

The operation of the air treatment system 1 may be controlled as follows. In the air treatment system 1, set air flow volume inputted from the plurality of remote controllers 60 is a basic amount of air supplied based on which the amount of air supplied by the plurality of fan units 30 is determined. However, if the set air flow volume is not changed, after the set temperature is reached, the temperature falls below the set temperature in the cooling operation and exceeds the set temperature in the heating operation. To address this, in order to converge the indoor air temperature on the set temperature, the amount of air supplied by each fan unit 30 is changed from the set air flow volume in response to a command (command value of air flow volume) from the main controller 40. The main controller 40 calculates an air conditioning load on the basis of the temperature difference between the indoor air temperature and the set temperature, and determines a necessary amount of air supplied on the basis of the air conditioning load and the blowing temperature of each fan unit 30. For example, since the air conditioning load is 0 (zero) for the case where the indoor air temperature matches the set temperature and there is no temperature difference, the main controller 40 stops blowing air for the fan unit 30 whose indoor air temperature matches the set temperature, even if the set air flow volume is not 0 (zero). However, in order to prevent air from flowing backward from the opening 71 toward the heat exchanger unit 10, even the fan unit 30, which is to be stopped if judged on the basis of the air conditioning load, may be so controlled that the amount of air supplied is not set to 0 (zero) in order to control the backflow.

(8-12-1) At Startup

The fan controllers 34 of the fan units 30a to 30d each send, to the main controller 40, the amount of air supplied by the fan units 30a to 30d from the set air flow volume of the four remote controllers 60. Note that the air treatment system 1 may be so configured that, when even the stopped fan unit 30 is in operation of extremely slightly sending air in order to prevent air from flowing backward from the opening 71 toward the heat exchanger unit 10, the minute amount of air supplied is also included in the total air flow volume. Alternatively, the air treatment system 1 may be so configured that the minute amount of air supplied is not included in the total air flow volume.

The main controller 40 calculates total air flow volume of air passing through the use side heat exchanger 11 by summing the amount of air supplied from all the fan units 30. The main controller 40 calculates an air temperature of air sucked into the heat exchanger unit 10 from the suction temperature sensor 101 of the heat exchanger unit 10. The main controller 40 then requests, from the heat source controller 56 of the heat source unit 50, a necessary refrigerant circulation rate calculated on the basis of the total air flow volume of air passing through the use side heat exchanger 11 and the air temperature. The heat source controller 56 of the heat source unit 50 changes the refrigerant circulation rate by changing the operating frequency of the compressor 51 in response to the request from the main controller 40.

(8-12-2) During Normal Operation

In the normal operation, the air treatment system 1 changes the control between a case where the total air flow volume is equal to or greater than a lower limit value and a case where the total air flow volume is smaller than the lower limit value.

(8-12-2-1) Case where Total Air Flow Volume is Equal to or Greater than Lower Limit Value When a predetermined time has passed since the startup and the system is in normal operation, the main controller 40 determines whether or not the total air flow volume is equal to or greater than the lower limit value. Setting of the lower limit value is described later. If the total air flow volume is equal to or larger than the lower limit value, the main controller 40 controls the air treatment system 1 in the following steps.

When a predetermined time has passed since the startup and the system is in normal operation, each fan controller 34 is configured to recalculate an amount of air supplied at a predetermined interval. In the recalculation, for example, the indoor air temperature detected by the remote controller 60 is used to calculate the air conditioning load on the basis of a situation where the indoor air temperature in the vicinity of each blower unit 70 is "close to" or "far from" the set temperature, and each fan controller 34 corrects the set air flow volume. Then, the corrected amount of air supplied corrected by each fan unit 30 is sent to the main controller 40. Note that another configuration is possible in which the main controller 40 makes the calculation related to the correction to the set air flow volume. The main controller 40 recalculates the amount of air supplied, which is sent from the plurality of fan controllers 34 for each interval, to calculate total air flow volume, and if the total air flow volume is equal to or greater than the lower limit value, the main controller 40 requests the heat source controller 56 of the heat source unit 50 to send a necessary refrigerant circulation rate calculated on the basis of the total air flow volume of the air passing through the use side heat exchanger 11 and the air temperature thereof for each interval. The heat source controller 56 of the heat source unit 50 changes the refrigerant circulation rate by changing the operating frequency of the compressor 51 in response to the request from the main controller 40.

(8-12-2-2) Case where Total Air Flow Volume is Smaller than Lower Limit Value In a case where the total air flow volume is smaller than the lower limit value, the main controller 40 calculates a shortage which is a difference between the calculated total air flow volume and the lower limit value. The main controller 40 allocates the shortage to the plurality of fan units 30 according to a predetermined air flow volume distribution rule. In a case where the shortage is allocated to the plurality of fan units 30, since if suffices if the total air flow volume is equal to or greater than the lower limit value, there are two cases: one is to allocate an amount of air supplied that matches the shortage and the other is to allocate an amount of air supplied that exceeds the shortage.

For example, a case where the lower limit value is 30 m³/min, the fan controller 34 of the fan unit 30a requests 16 m³/min, the fan controller 34 of the fan unit 30b requests 0 m³/min, the fan controller 34 of the fan unit 30c requests 10 m³/min, and the fan controller 34 of the fan unit 30d requests 6 m³/min to the main controller 40 is considered. At this time, the total air flow volume calculated by the main controller 40 is 32 m³/min>30 m³/min, and the main controller 40 determines that the total air flow volume is greater than the lower limit value.

Next, in response to the fan controller 34 of the fan unit 30c receiving a command to stop sending air from the remote controller 60, the request of the fan controller 34 of the fan unit 30c is changed from 10 m³/min to 0 m³/min. Then, since the total air flow volume reduces from 32 m³/min to 22 m³/min, the main controller 40 determines that a command to change the total air flow volume to be equal to or smaller than the lower limit value is given.

As an example, when determining that a command to change the total air volume to be equal to or smaller than the lower limit value is given, the main controller 40 evenly allocates the shortage to, for example, the operating fan units 30. In the above case, 8 (=30−22) m³/min is allocated to the fan unit 30a at 4 m³/min and to the fan unit 30b at 4 m³/min, which changes to 20 m³/min for the fan unit 30a and 10 m³/min for the fan unit 30d.

As another example, when determining that a command to change the total air volume to be equal to or smaller than the lower limit value is given, the main controller 40 evenly allocates the shortage to, for example, all the fan units 30. In the above case, 8 (=30-22) m³/min is allocated to the fan units 30a to 30d by 2 m³/min, which changes to 18 m³/min for the fan unit 30a, 2 m³/min for the fan unit 30b, 2 m³/min for the fan unit 30c, and 8 m3/min for the fan unit 30d.

(8-12-2-3) Setting of Lower Limit Value

The main controller 40 determines a lower limit value of the total air flow volume of the air treatment system 1 on the basis of, for example, a heat exchanger temperature. For example, in a case where the heat exchanger temperature is high during the cooling operation, the main controller 40 determines that the heat source unit 50 does not have enough capacity to supply heat energy, and sets the lower limit value of the total air flow volume at a high value. In comparison with such a case, in a case where the heat exchanger temperature is low during the cooling operation, the main controller 40 determines that there is room for the heat source unit 50 to supply heat energy, and sets the lower limit value of the total air flow volume at a value lower than that in the above-described case. The specific value of the lower limit value is determined by, for example, a test and/or simulation of an actual machine of the air treatment system 1.

(8-12-2-4) Detection of Air Backflow

For example, in the distribution flow path including the duct 20a, the fan unit 30a, and the blower unit 70a, airflow from the heat exchanger unit 10 toward the opening 71 is normal airflow, and conversely, airflow from the opening 71 toward the heat exchanger unit 10 is abnormal airflow and is air backflow. Similarly, in the distribution flow path including the ducts 20b to 20d, the fan units 30b to 30d, and the blower units 70b to 70d, airflow from the opening 71 toward the heat exchanger unit 10 is air backflow. The air flow volume detection unit 33 provided for each of the fan units 30a to 30d sends the detection result to the main controller 40 through the fan controller 34.

The main controller 40 determines that airflow is normal if the air pressure at the outlet 37 is lower or equal to the air pressure at the inlet 36 of the fan units 30a to 30d, and conversely, the main controller 40 determines that air backflow is occurring if the air pressure at the outlet 37 is higher than the air pressure at the inlet 36 of the fan units 30a to 30d.

(8-12-2-5) Operation when Air Backflow Occurs

The main controller 40 eliminates air backflow by operating together with the fan unit 30. Specifically, the main controller 40 detects the fan unit 30 that is connected to the distribution flow path where the air backflow is occurring. The main controller 40 sends a command (command value of air flow volume) to increase the rotation speed of the fan motor 38 to the fan controller 34 of the fan unit 30 in the distribution flow path where the air backflow is occurring. For example, in a case where the fan motor 38 stops, a command (command value of air flow volume) to start driving at a predetermined rotation speed is sent. For example, in a case where the fan motor 38 rotates at a low speed, a command to further increase the rotation speed of the fan motor 38 (command value of air flow volume) is sent.

Note that the air deflector 74 may be used to eliminate the air backflow, provided the air deflector 74 can change the air resistance. For example, a configuration is possible in which the air deflector 74 of the blower unit 70 where the air backflow is occurring is fully closed in a case where the fan motor 38 stops. Another configuration is possible in which, in a case where the fan motor 38 rotates at a low speed, a command (command value of air flow volume) to further increase the rotation speed of the fan motor 38 and increase the air resistance of the air deflector 74 is sent.

Another configuration may be used in which a backflow prevention damper that is fully closed only by the force of the air backflow is provided in the distribution flow path. In such a case, the backflow can be prevented even without a command from the main controller 40.

(8-12-3) Another Control Method

In the control method described above, the lower limit value of the total air flow volume is determined on the basis of the heat exchanger temperature of the use side heat exchanger 11; however, the condensation temperature (TC), the evaporation temperature (TE), the degree of superheating (SH), and the degree of subcooling (SC) may be used to determine the lower limit value of the total air flow volume. The degree of superheating can be calculated by using, for example, the inlet temperature and the outlet temperature of the use side heat exchanger 11, or the inlet pressure and the outlet temperature of the use side heat exchanger 11. The degree of subcooling can be calculated using, for example, the inlet temperature and the outlet temperature of the use side heat exchanger 11, or the inlet pressure and the outlet temperature of the use side heat exchanger 11.

The lower limit value of the total air flow volume may be, for example, a fixed value determined in advance, and if the lower limit value is determined to be 8 m³/min in advance, then the main controller 40 performs control so that the lower limit value does not fall below the lower limit value of 8 m³/min at any time.

The air treatment system 1 may be so configured that, in the cooling operation, the lower limit value of the total air flow volume is determined according to, for example, the degree of superheating, the current total air flow volume, and the suction temperature of the air sucked into the heat exchanger unit 10. The air treatment system 1 may be so configured that, in the heating operation, the lower limit value of the total air flow volume is determined according to the degree of subcooling, the current total air flow volume, and the suction temperature of the air sucked into the heat exchanger unit 10. Alternatively, the air treatment system 1 may be so configured that the lower limit value of the total air flow volume is determined according to the refrigerant circulation rate (operating frequency of the compressor 51, for example), the evaporation temperature (TE), the temperature of the air sucked into the heat exchanger unit 10, and the sucked air flow volume. The air treatment system 1 may be so configured that the lower limit value of the total air flow volume is determined according to the current air flow volume and the excess and deficiency of air flow volume calculated on the basis of the degree of dryness or the degree of wetness of the refrigerant after passing through the use side heat exchanger 11. Further, the air treatment system 1 may be so configured that the lower limit value of the total air flow volume is determined according to the refrigerant pressure and the temperature of the refrigerant. at the outlet of the use side heat exchanger 11

(8-13) Modification 1M

8-13-1

In the modification L, the description provides an example of the fan motor 38 capable of changing the rotation speed as a plurality of actuators configured to change individual amounts of air supplied of conditioned air sucked from the heat exchanger unit 10 through the plurality of ducts 20 and supplied to the plurality of openings 71 of the air conditioned space TS. However, the actuator is not limited to the fan motor 38, and for example, a driving motor (not shown) of a damper may be used as the plurality of actuators. The fan motor 38 of the fan 32 shown in FIG. 5 may be a motor of a type capable of changing the rotation speed similar to that of the first embodiment, or may be a motor of a type incapable of changing the rotation speed. In a case where the fan motor 38 is the motor of a type incapable of changing the rotation speed, the amount of air supplied (air flow volume) from the fan unit 30 to the blower unit 70 is changed only by the damper. On the other hand, in a case where the fan motor 38 is the motor of a type capable of changing the rotation speed, the amount of air supplied (air flow volume) from the fan unit 30 to the blower unit 70 is changed not only with change in the opening degree of the damper but with change in the rotation speed of the fan motor 38.

Further, as a unit for changing individual amounts of air supplied of conditioned air to be supplied to the opening 71, a damper unit with a damper but no fan can be used. In other words, the air treatment system 1 can be so configured as to include, for example, a fan unit that only rotates the fan at a constant speed and does not have a function to change the amount of air supplied, and a damper unit separate from the fan unit. For example, the air treatment system 1 may be so configured that a damper unit capable of changing the amount of air supplied with a damper is provided in a part of at least one of the ducts 20a to 20d. Alternatively, the air treatment system 1 may be so configured that the fan unit 30 having a function to change the amount of air supplied and the damper unit having a function to change the amount of air supplied are disposed together in at least one of the ducts 20a to 20d.

(8-13-2) Operation when Backflow Occurs

The main controller 40 eliminates air backflow by operating together with the fan unit 30. In order to eliminate the air backflow, first, the main controller 40 detects the fan unit 30 that is connected to the distribution flow path where the air backflow is occurring. In a case where the fan unit 30 is configured to adjust the amount of air supplied only with the damper, the main controller 40 sends a command to change the opening degree of the damper to the fan controller 34 of the fan unit 30 in the distribution flow path where the air backflow is occurring. For example, in a case where the fan unit 30 where the air backflow is occurring is not operated, a command to fully close the damper is sent. Since air backflow does not normally occur when the fan motor 38 sends air at a constant rotation with the opening degree of the damper, the main controller 40 notifies the user of the occurrence of an abnormality, for example, with the remote controller 60 if the air backflow occurs in such a case.

In a case where the fan unit 30 is configured to adjust the amount of air supplied with both the rotation speed of the fan motor 38 and the opening degree of the damper, the main controller 40 sends a command to change the rotation speed of the fan motor 38 and/or the opening degree of the damper to the fan controller 34 of the fan unit 30 in the distribution flow path where the air backflow is occurring. For example, in a case where the fan unit 30 where the air backflow is occurring is not operated, a command to fully close the damper is sent. For example, in a case where the fan motor 38 rotates at a low speed, a command to further increase the rotation speed (command value of air flow volume) is sent. Another configuration is possible in which, for example, in a case where the fan motor 38 rotates at a low speed, a command (command value of air flow volume) to reduce the opening degree of the damper and increase the rotation speed of the fan motor 38 is sent.

(8-14) Modification 1N

In the first embodiment, the description provides the case where the air flow volume detection unit 33 is used as the detection device for detecting air backflow; however, the detection device for detecting air backflow is not limited to the air flow volume detection unit 33. Such a detection device may be a directional wind speed sensor. In a case where the directional wind speed sensor is used instead of the air flow volume detection unit 33, the wind speed sensor is disposed in, for example, the fan unit 30 and connected to the fan controller 34. In the case of using the directional wind speed sensor, for example, the main controller 40 can detect that air flows in a normal direction when the wind speed is in the positive direction, and that air backflow is occurring when the wind speed is in the negative direction opposite to the normal direction. In addition, the detection device can be configured using a plurality of non-directional wind speed sensors. The plurality of non-directional wind speed sensors detects the distribution of wind speed, and if the distribution of wind speed is distribution that occurs during backflow, then the main controller 40 can determine that the backflow is occurring.

(8-15) Modification 1O

In the first embodiment, the description is given of the case where the plurality of fan controllers 34 of the plurality of fan units 30 is directly connected in parallel to the main controller 40 installed in the heat exchanger unit 10. However, the plurality of fan units 30 may be classified into a master unit and a slave unit, and the fan controller 34 may be connected to the main controller 40.

Figure 8:
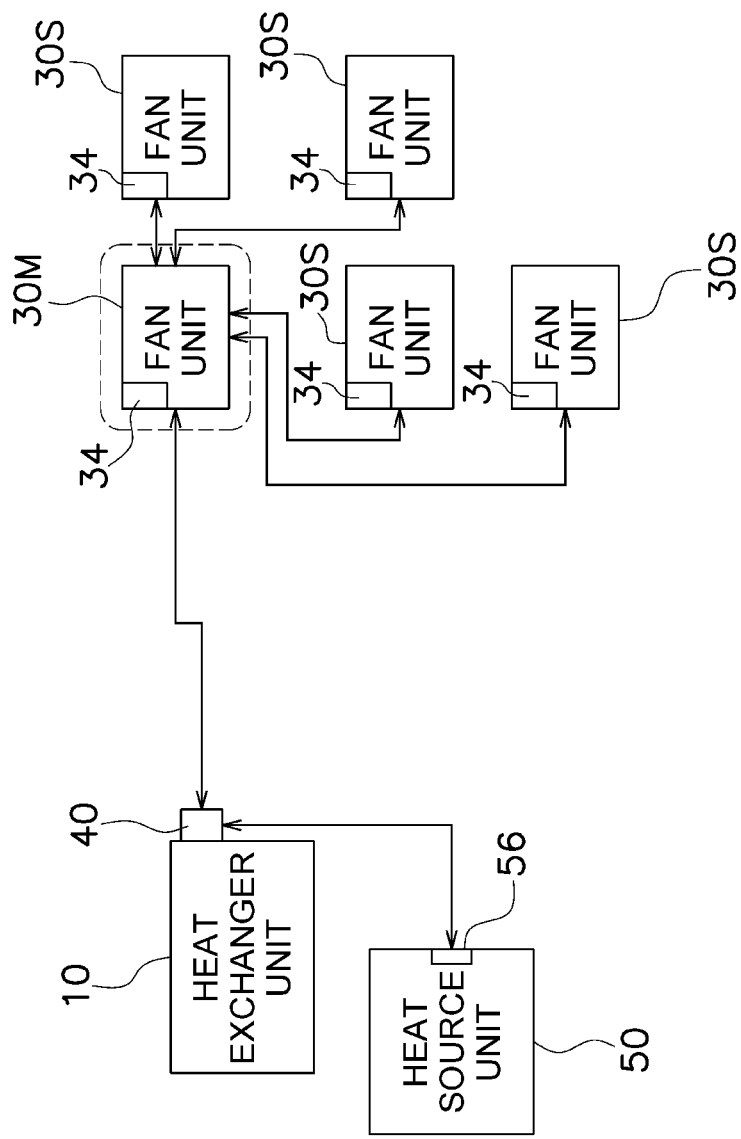
FIG. 8 is a block diagram for explaining the connection relationship between a main controller and a fan controller of a modification 1O.

For example, in a case where five fan units 30M and 30S are connected to one heat exchanger unit 10, as shown in FIG. 8, the five fan units are classified into one fan unit 30M as the master unit and the four fan units 30S as the slave units. The five fan units 30M and 30S have the same configuration as that of the fan unit 30 described above. The main controller 40 of the heat exchanger unit 10 is connected to the heat source controller 56 of the heat source unit 50 and one fan unit 30M as the master unit. Further, the fan controller 34 of the one fan unit 30M as the master unit is connected to the fan controllers 34 of the four fan units 30S as the slave units. The main controller 40 manages the fan controllers 34 of the four fan units 30S as the slave units through the fan controller 34 of the fan unit 30M as the master unit. The main controller 40 may directly give a command (command value of air flow volume) to the fan controllers 34 of the four slave units, or the fan controller 34 of the fan unit 30M as the master unit may give a command in response to the command (command value of air flow volume) from the main controller 40.

(8-16) Modification 1P

Figure 9:
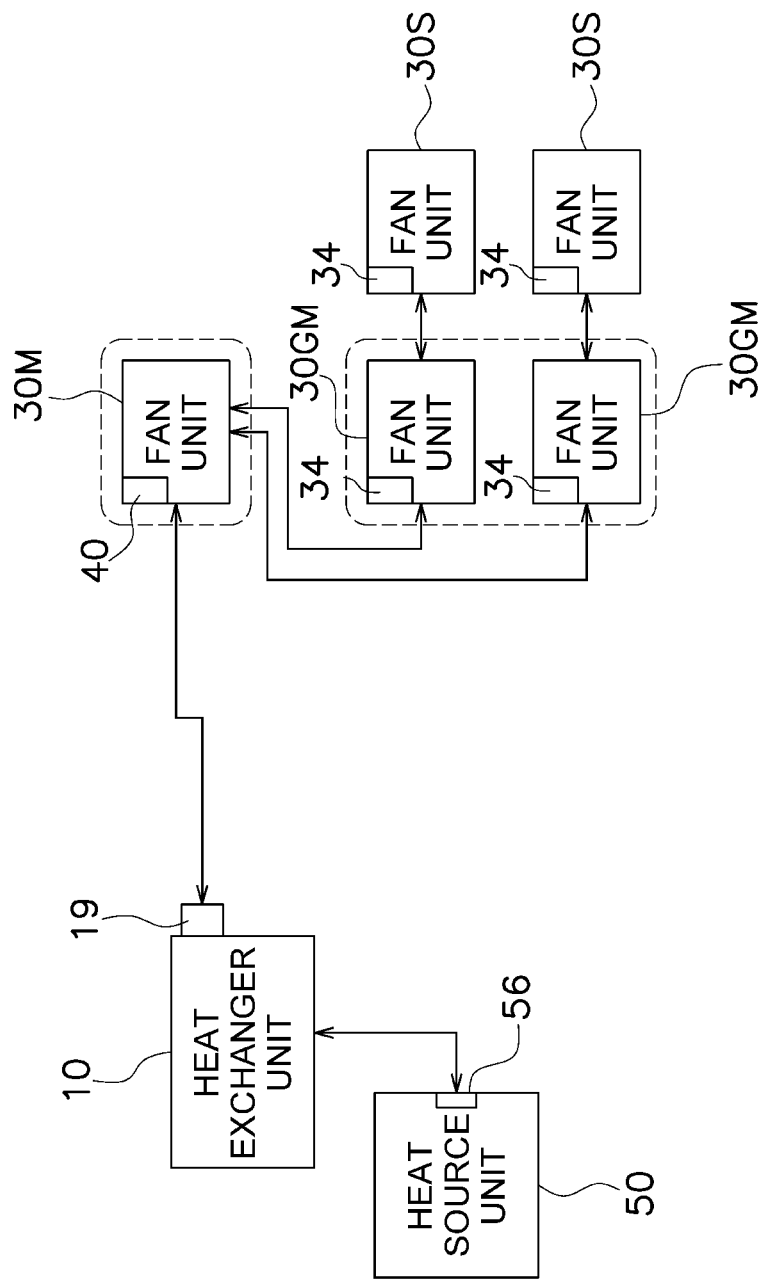
FIG. 9 is a block diagram for explaining an example of the connection relationship between a main controller and a fan controller of a modification 1P.
Figure 10:
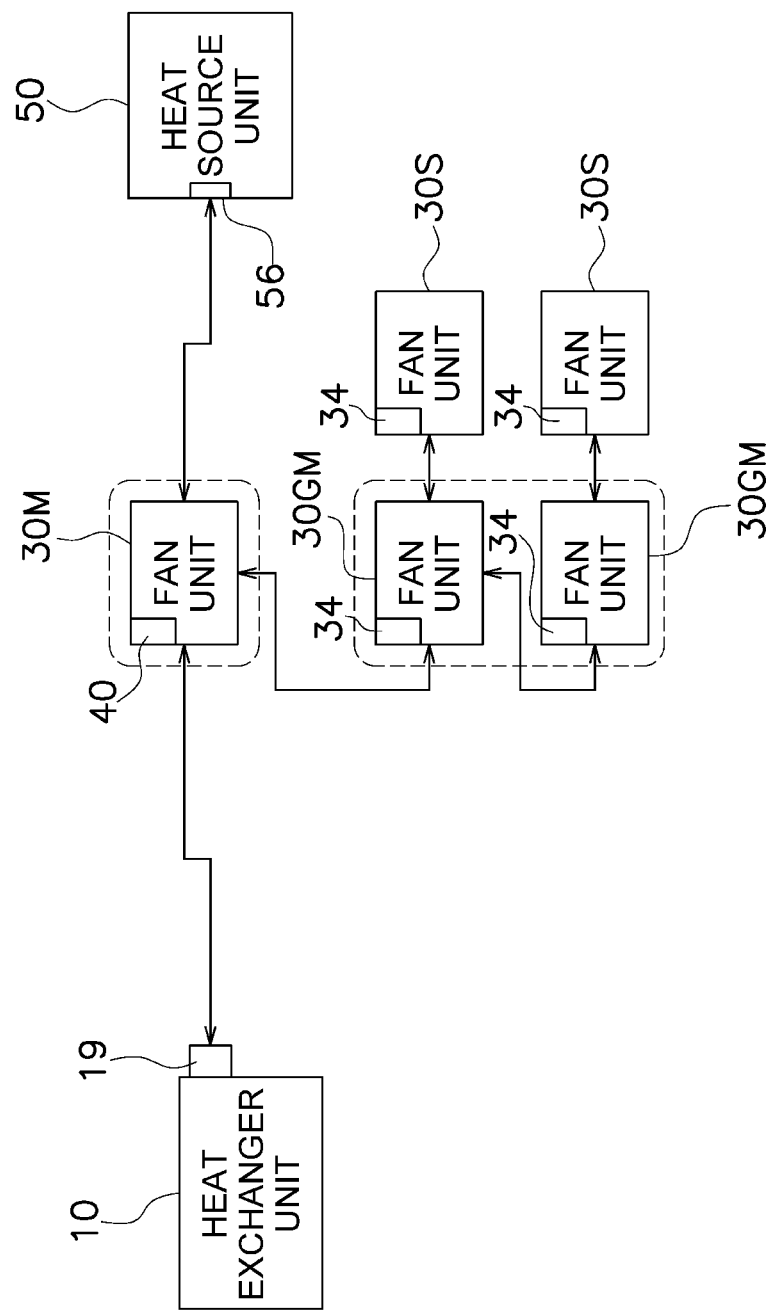
FIG. 10 is a block diagram for explaining another example of the connection relationship between the main controller and the fan controller of the modification 1P.

In the first embodiment and the modification 1O, the main controller 40 is installed in the heat exchanger unit 10; however, the main controller 40 may be installed in the fan unit 30M as the master unit as shown in FIG. 9 or 10.

In such a case, the heat exchanger unit 10 is provided with a terminal 19 for connection to various sensors disposed therein. The main controller 40 is connected to a sensor inside the heat exchanger unit 10 through the terminal 19 of the heat exchanger unit 10. As shown in FIG. 9, the heat source controller 56 of the heat source unit 50 is connected to the main controller 40 of the fan unit 30M through the heat exchanger unit 10. Alternatively, as shown in FIG. 10, the heat source controller 56 of the heat source unit 50 is directly connected to the main controller 40 of the fan unit 30M.

For example, in a case where the five fan units 30M, 30GM, and 30S are connected to one heat exchanger unit 10, as shown in FIG. 9 or 10, the five fan units are classified into the one fan unit 30M as the master unit, the two fan units 30GM as group master units, and the two fan units 30S as the slave units. Here, the fan controller 34 of the fan unit 30M as the master unit is only replaced with the main controller 40, and the configurations of the five fan units 30M, 30GM, and 30S are the same as that of the fan unit 30 described above. The main controller 40 of the fan unit 30M is connected to the fan units 30GM as the group master units. Next, the fan controller 34 of the fan unit 30GM as each of the group master units is connected to the fan controller 34 of the fan unit 30S as the slave unit of each group. The description herein takes the case where the fan controller 34 of one fan unit 30S as the slave unit is connected to the fan controller 34 of one fan unit 30GM as the group master unit; however, the number of fan controllers 34 of the slave units connected to the fan controller 34 of the group master unit is not limited to one, and may be two or more. Further, the number of group master units is not limited to two, and may be one or three or more. Another configuration is possible in which a plurality of fan controllers 34 of the fan units 30S as the slave units is connected in parallel to the main controller 40 of one fan unit 30M.

The main controller 40 manages the fan controllers 34 of the two fan units 30GM as the group master units. In addition, the main controller 40 manages the fan controllers 34 of the two fan units 30S as the group slave units through the fan controllers 34 of the fan units 30GM as the group master units. The main controller 40 may directly give a command (command value of air flow volume) to the fan controllers 34 of the two slave units, or the fan controller 34 of the group master unit may give a command in response to the command (command value of air flow volume) from the main controller 40.

(8-17) Modification 1Q

In the first embodiment and the modifications 1O to 1P, the main controller 40 is installed in the heat exchanger unit 10; however, as shown in FIG. 11, 12, 13, or 14, the main controller 40 may be installed in a place other than the heat exchanger unit 10, the fan unit 30, and the heat source unit 50.

In such a case, the heat exchanger unit 10 is provided with a terminal 19 for connection to various sensors disposed therein. The main controller 40 is connected to a sensor inside the heat exchanger unit 10 through the terminal 19 of the heat exchanger unit 10.

Figure 11:
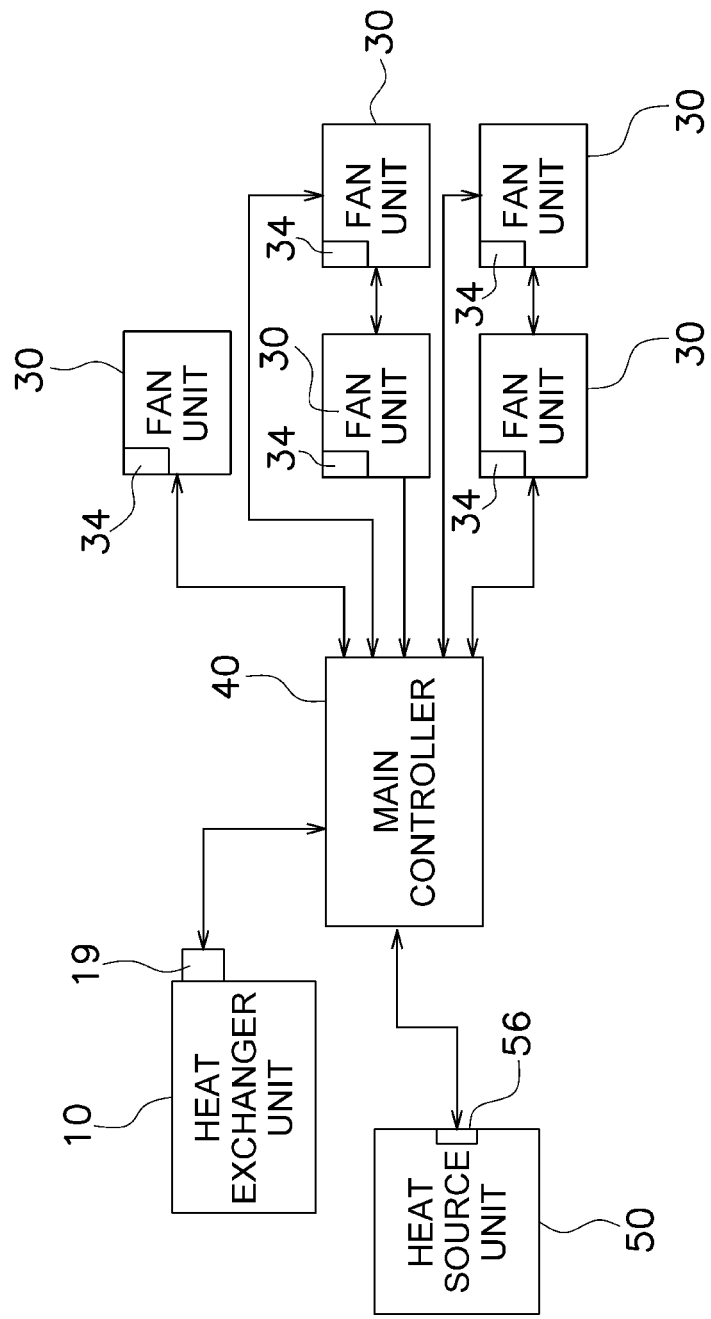
FIG. 11 is a block diagram for explaining an example of the connection relationship between a main controller and a fan controller of a modification 1Q.

FIG. 11 is a block diagram showing a configuration in which the main controller 40, the fan controller 34, and the heat source controller 56 are connected in a manner similar to those in the first embodiment, and the installation position of the main controller 40 is changed from the heat exchanger unit 10 in the first embodiment to another place.

Figure 12:
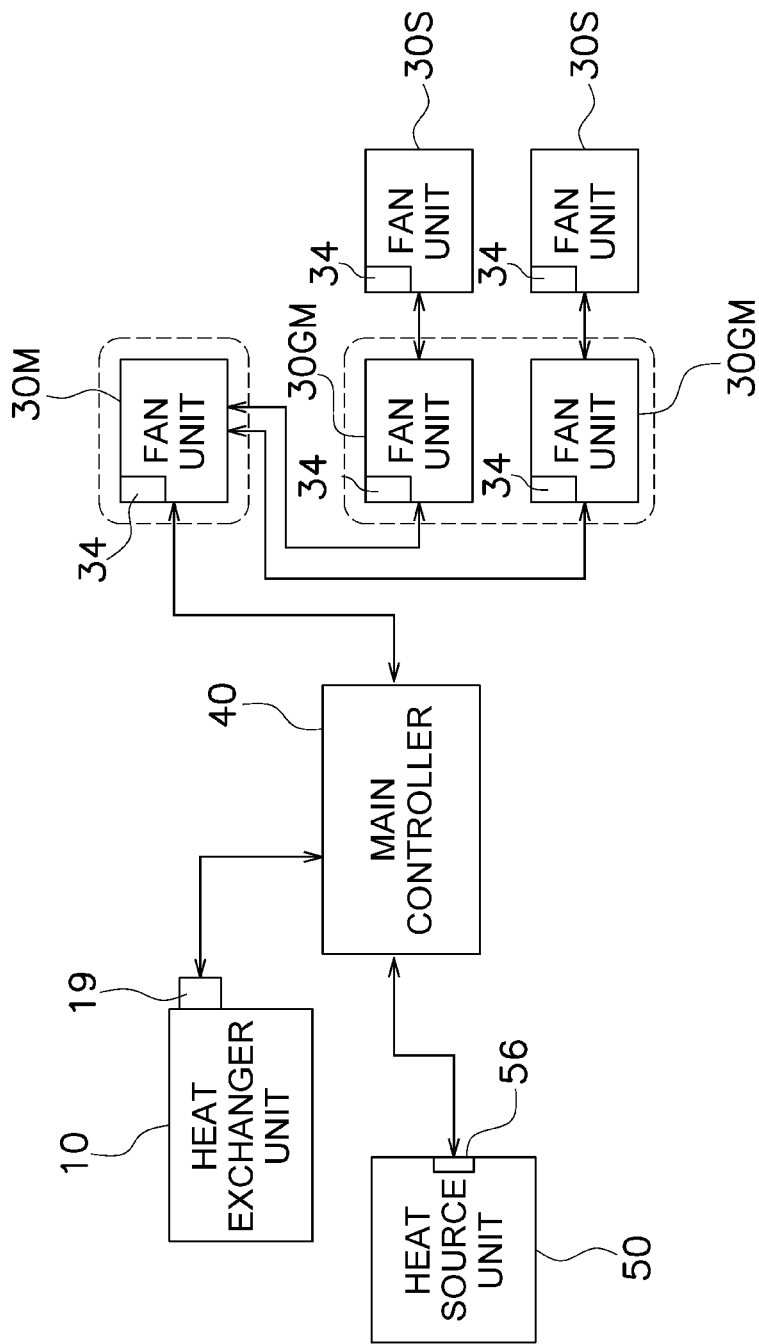
FIG. 12 is a block diagram for explaining another example of the connection relationship between the main controller and the fan controller of the modification 1Q.

FIG. 12 is a block diagram showing a configuration in which the main controller 40, the fan controller 34, and the heat source controller 56 are connected in a manner similar to those in the modification 1O shown in FIG. 9, and the installation position of the main controller 40 is changed from the heat exchanger unit 10 in the modification 1O to another place.

(8-18) Modification 1R

Figure 13:
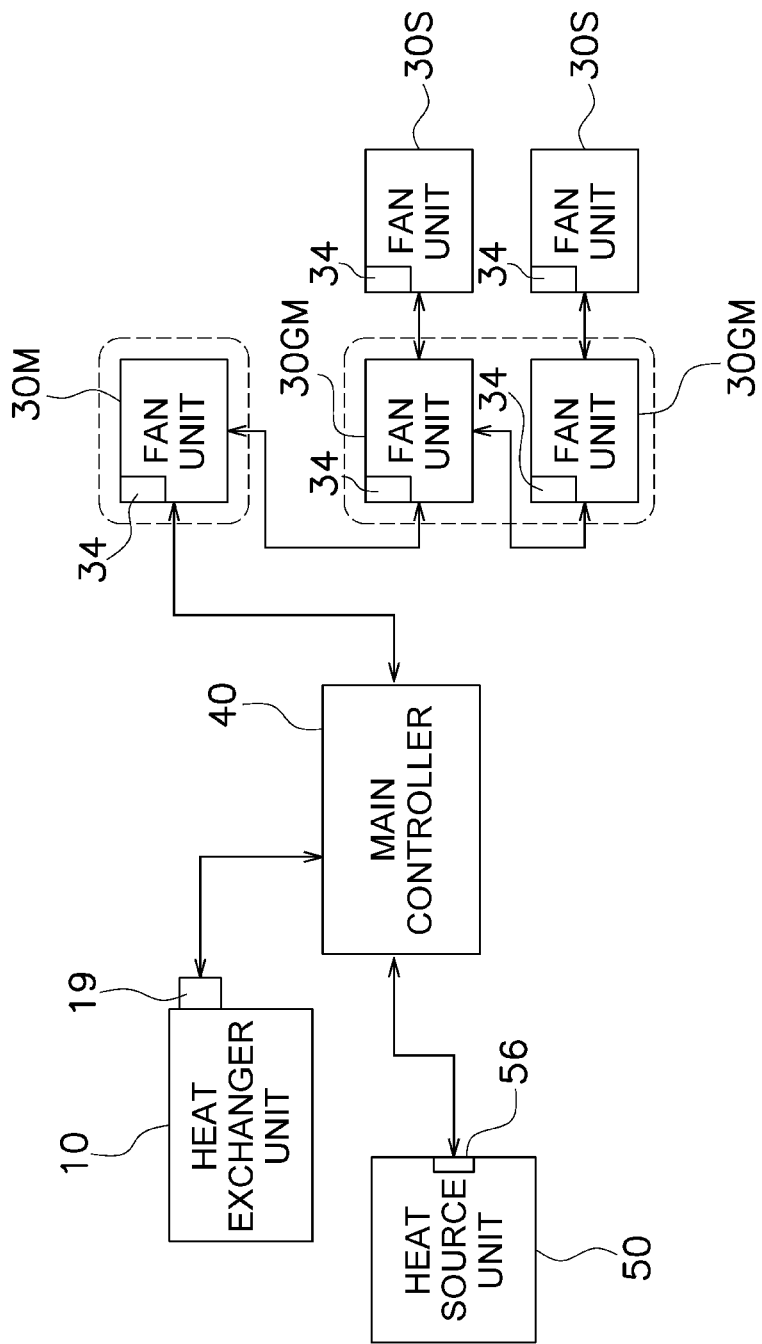
FIG. 13 is a block diagram for explaining yet another example of the connection relationship between the main controller and the fan controller of the modification 1Q.

In the modification 1Q, the description takes the case where the plurality of fan controllers 34 of the plurality of fan units 30 is directly connected in parallel to the main controller 40 (see FIG. 11) and the case where the fan controllers 34 of the two fan units 30GM as the group master units are connected to the fan controller 34 of the one fan unit 30M as the master unit and the fan controller 34 of the fan unit 30S as the slave unit is connected to the group master unit (see FIGS. 12 and 13). However, instead of providing the entire master unit, the master units may be classified into group master units and the fan controller 34 may be connected to the main controller 40.

Figure 14:
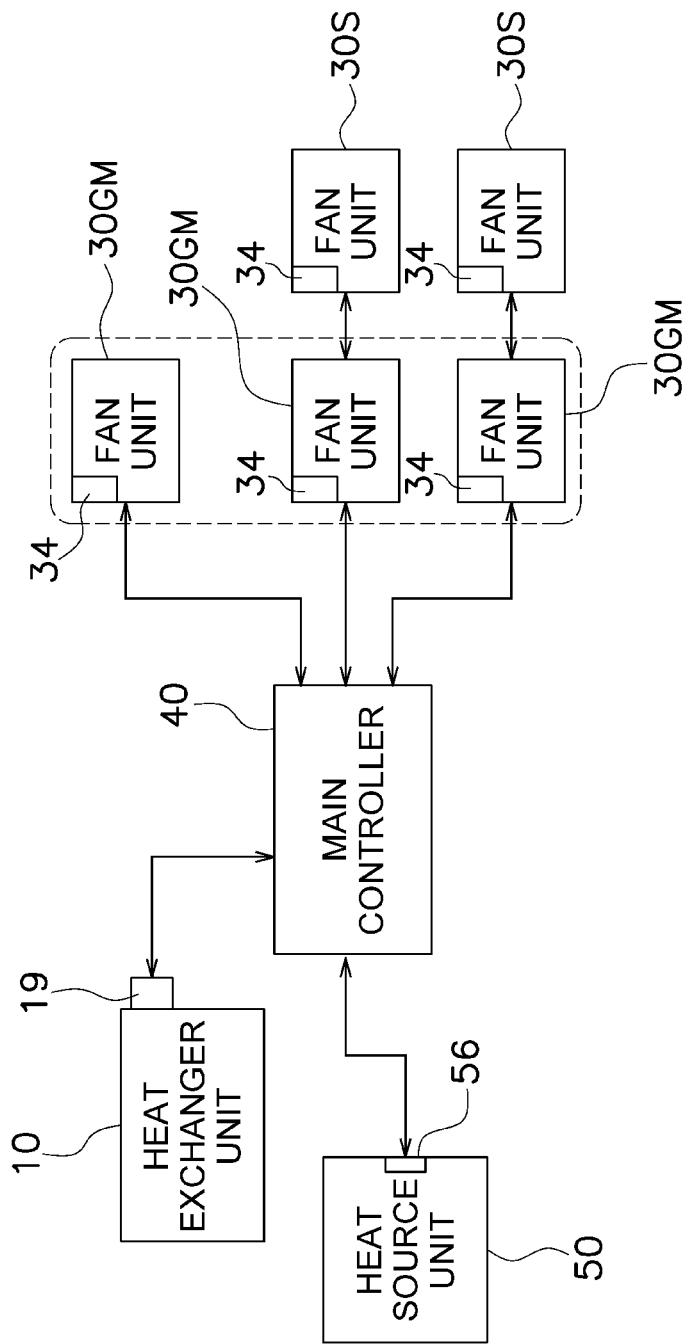
FIG. 14 is a block diagram for explaining another example of the connection relationship between a main controller and a fan controller of a modification 1R.

For example, in a case where the five fan units 30GM and 30S are connected to one heat exchanger unit 10, as shown in FIG. 14, the five fan units are classified into the three fan units 30GM as the group master units and the two fan units 30S as the slave units. The five fan units 30GM and 30S have the same configuration as that of the fan unit 30 described above. The main controller 40 of the heat exchanger unit 10 is connected to the heat source controller 56 of the heat source unit 50 and the three fan units 30GM as the group master units. Next, the fan controllers 34 of the two fan units 30GM as the group master units are connected to the fan controller 34 of the fan unit 30S as the slave unit of each group. However, the fan controller 34 as the slave unit is not connected to the fan controller 34 of the one fan unit 30GM as the group master unit. The description herein takes the case where the fan controller 34 of one fan unit 30S as the slave unit is connected to the fan controller 34 of one fan unit 30GM as the group master unit and the case where the fan controller 34 of the slave unit is not connected to the fan controller 34 of the one fan unit 30GM as the group master unit; however, the number of fan controllers 34 of the slave units connected to the fan controller 34 of the group master unit is not limited to one, and may be two or more.

The main controller 40 manages the fan controllers 34 of the two fan units 30S as the group slave units through the fan controllers 34 of the two fan units 30GM as the group master units. The main controller 40 may directly give a command (command value of air flow volume) to the fan controllers 34 of the two slave units, or the fan controller 34 of the group master unit may give a command in response to the command (command value of air flow volume) from the main controller 40.

As described above, since the main controller 40 is disposed in a place other than the heat exchanger unit 10 and the plurality of fan units 30, the installation of the main controller 40 is no longer limited to the heat exchanger unit 10 and the plurality of fan units 30GM and 30S, which increases the flexibility of the installation of the main controller 40 and makes it easy to handle the main controller 40.

(8-19) Modification 1S

For example, a configuration is possible in which the main controller 40 or the fan controller 34 calculates air flow volume by using the operating current of the fan 32 on the basis of the workload of the fan motor 38. In such a case, a device that detects the operating current serves as the air flow volume detection unit.

(8-20) Modification 1T

In the first embodiment, the description takes the case where the main controller 40 calculates a refrigerant circulation rate, sends a request for changing the operating frequency of the compressor 51 to the heat source controller 56, and the heat source controller 56 controls the operating frequency of the compressor 51. However, the air treatment system 1 may be so configured that the main controller 40 controls the operating frequency of the compressor 51 and/or the opening degree of the expansion valve 53.

(8-21) Modification 1U

In the first embodiment, the description takes the case where the plurality of ducts 20a to 20d is connected to the heat exchanger unit 10, and the ducts 20a to 20d extend from the heat exchanger unit 10 to the fan units 30 without branching off on the way. However, a duct branching off on the way may be used in the air treatment system 1. For example, the air treatment system 1 may be so configured that one fan unit 30 is connected to each branch of one duct, respectively.

(8-22) Modification 1V

In the first embodiment, the description takes the case where the heat exchanger unit 10, which is an air treatment unit, does not have a blower for sending, to the duct 20, the conditioned air that has been subjected to heat exchange by the use side heat exchanger 11. However, the air treatment unit may include a blower for sending the conditioned air to the duct 20 to which the fan unit 30 is connected.

(9) Additional Description of the Modifications and the First Embodiment 9-1

The air treatment system 1 of the first embodiment includes the controller 400, the plurality of ducts 20, 20a to 20e, and the plurality of fan units 30, 30a to 30d, 30M, 30GM, and 30S. The plurality of ducts 20, 20a to 20 serves to distribute the conditioned air that has passed through the use side heat exchanger 11 of the heat exchanger unit 10. The plurality of fan units 30, 30a to 30d, 30M, 30GM, and 30S is provided so as to correspond to the plurality of ducts 20, 20a to 20e, and supply the conditioned air from the heat exchanger unit 10 through the plurality of ducts 20, 20a to 20e to the air conditioned space TS. The plurality of actuators is configured to change the amount of conditioned air supplied to the air conditioned space TS. In the first embodiment, the plurality of actuators is selected from among the plurality of fan motors 38, the plurality of driving motors, and the plurality of air deflector motors 75. The plurality of actuators is the plurality of fan motors 38, the plurality of driving motors, or the plurality of air deflector motors 75 in some cases. In addition, the plurality of actuators may include different types of actuators, for example, both the fan motor 38 and the driving motor at the same time. Each of the plurality of ducts 20, 20a to 20e is disposed in one of the plurality of distribution flow paths. Each of the plurality of fan units 30, 30a to 30d, 30M, 30GM, and 30S includes the fans 32, 32a to 32d, which are first fans, and is arranged in one of the plurality of distribution flow paths. Each of the plurality of actuators is disposed in one of the plurality of distribution flow paths. The controller 400 controls the plurality of actuators to control the amounts of air supplied of the plurality of fan units 30, 30a to 30d, 30M, 30GM, and 30S. As a result, the air treatment system 1 of the first embodiment can adjust the volume of air passing through the use side heat exchanger 11 for efficient heat exchange in the use side heat exchanger 11, leading to the reduction in energy consumption.

9-2

The main controller 40 of the controller 400 of the first embodiment gives a plurality of commands concerning the amount of air supplied by the plurality of fan units 30 in order to control the rotation speed of the plurality of fan motors 38 which is a plurality of actuators of the plurality of fan units 30, the driving motors of the plurality of dampers, or the air deflector motor 75 of the air deflector 74. This enables adjustment to the volume of air passing through the use side heat exchanger 11 for efficient heat exchange in the use side heat exchanger 11, leading to the reduction in energy consumption.

9-3

In the air treatment system 1 according to the first embodiment, since the main controller 40 is disposed in the heat exchanger unit 10, it suffices if construct a network connecting the main controller 40 and the fan motors 38, which are a plurality of actuators, in accordance with the flow of the conditioned air supplied from the heat exchanger unit 10. Therefore, a network for sending a command from the main controller 40 can be easily constructed with the heat exchanger unit 10 as a starting point.

9-4

In a case where the main controller 40 is disposed in the fan unit 30M as the master unit which is one of the plurality of fan units 30, the air treatment system 1 including one main controller 40 in the plurality of fan units 30 can be formed by connecting the network of the plurality of fan units 30, which facilitates the construction of the air treatment system 1. In other words, since it is only required that at least one fan unit 30M as the master unit is included in the plurality of fan units 30, the air treatment system 1 can be easily designed and constructed.

Note that, in a case where a plurality of main controllers 40 is present, the plurality of main controllers 40 may be configured to cooperate and act like one main controller. For example, in a case where an extension is made, the newly added main controller 40 and the main controller 40 existing before the extension can be configured to communicate with each other to function as one new main controller.

9-5

In a case where the main controller 40 is disposed in a place other than the heat exchanger unit 10 and the plurality of fan units 30, the installation of the main controller 40 is no longer limited to the heat exchanger unit 10 and the plurality of fan units 30M, 30GM and 30S, which increases the flexibility of the installation of the main controller 40 and makes it easy to handle the main controller 40.

9-6

The air treatment system 1 of the first embodiment is so configured that the airflow passing through the use side heat exchanger 11 is generated only by the air suction force of the plurality of fan units 30. As a result, since the heat exchanger unit 10 does not need to include a power source for generating the airflow, the cost can be reduced as compared with the case where a power source for generating the airflow is provided in the heat exchanger unit 10. In addition, the heat exchanger unit 10 can be easily made thinner, and the range in which the air treatment system 1 is installed can be expanded.

9-7

In a case where the heat exchanger unit 10 includes at least one of the gas pipe temperature sensor 102, the liquid pipe temperature sensor 103, and the use side heat exchanger temperature sensor 104 that are heat medium temperature sensors for detecting the temperature of the refrigerant that is a heating medium flowing through the use side heat exchanger 11 or the pipe connected to the use side heat exchanger 11, and the suction temperature sensor 101 for detecting the temperature of the air sucked into the heat exchanger unit, and where the main controller 40 uses a detected value of at least one of the heat medium temperature sensor and the suction temperature sensor to determine a command concerning the increase or decrease in the amount of air supplied, the main controller 40 easily gives a command to supply, to the plurality of fan units 30, air to meet the operating conditions of the heat exchanger unit 10. For example, in a case where the heat energy supplied from the heat source unit 50 to the heat exchanger unit 10 is insufficient, the main controller 40 reduces the amount of air supplied on the basis of the detected value of the use side heat exchanger temperature sensor 104, which reduces a problem such as excessive dropping of the temperature of the refrigerant supplied from the heat source unit 50.

9-8

The remote controller 60 of the air treatment system 1 of the first embodiment has a set temperature function to set temperatures of the rooms RM1 and RM2 that are the air conditioned spaces TS and an indoor temperature detection function. The main controller 40 uses the set temperature of the remote controller 60 and the room temperature detected by the remote controller 60 to determine a command concerning the increase or decrease in the amount of air supplied. As a result, the main controller 40 can give a command to bring the temperature of the air conditioned space TS closer to the set temperature. In the first embodiment, the remote controller 60 is installed at a plurality of locations of the room RM1 that is the air conditioned space TS, which makes it easy to bring the indoor air temperature at each of the plurality of locations closer to the set temperature.

9-9

The air treatment system 1 of the first embodiment includes the compressor 51 for compressing the refrigerant to be circulated in the use side heat exchanger 11, the heat source side heat exchanger 52 for exchanging heat of the refrigerant circulated in the use side heat exchanger 11, and the expansion valve 53 for expanding the refrigerant passing between the use side heat exchanger 11 and the heat source heat exchanger 52. The main controller 40 is connected, through the heat source controller 56, to the compressor 51 and/or the expansion valve 53 to control the system operation. As a result, it is possible to appropriately control the system operation by controlling the rotation speed of the compressor 51 and/or the opening degree of the expansion valve 53 so as to achieve a refrigerant circulation rate, for example, derived by calculation together with the increase or decrease in the amount of air supplied, and it is possible to control the increase or decrease in the amount of air supplied while causing the refrigerant circulating through the use side heat exchanger 11 and the heat source side heat exchanger 52 to perform an appropriate refrigeration cycle.

9-10

In the air treatment system 1 of the first embodiment, since the main controller 40 is connected to the compressor 51 and/or the expansion valve 53 for control over the system operation, the main controller 40 can appropriately control the system operation by controlling the rotation speed of the compressor 51 and/or the opening degree of the expansion valve 53 so as to, for example, achieve the refrigerant circulation rate derived by calculation with the increase or decrease in the amount of air supplied. The main controller 40 can control the increase or decrease in the amount of air supplied while causing the refrigerant circulating through the use side heat exchanger 11 and the heat source heat exchanger 52 to perform an appropriate refrigeration cycle.

9-11

In the air treatment system 1 of the first embodiment, the main controller 40 controls the fan motor 38 that is an actuator or the damper on the basis of information indicating the rotation speed of the compressor 51 and/or the opening degree of the expansion valve 53 for control over the system operation; therefore, it is possible to control the increase or decrease in the amount of air supplied while causing the refrigerant circulating through the use side heat exchanger and the heat source side heat exchanger to perform an appropriate refrigeration cycle.

9-12

The main controller 40 controls air flow volume of air passing through the use side heat exchanger 11 with the plurality of fan motors 38 while adjusting the fan motor 38 that is a plurality of actuators in order to prevent backflow, in the plurality of ducts 20, of the conditioned air flowing from the heat exchanger unit 10 toward the plurality of openings 71. As a result, it is possible to prevent reduction in heat exchange efficiency due to the backflow of the conditioned air in the plurality of ducts. Further, together with the control described above, the main controller 40 controls the circulation amount of the refrigerant by the rotation speed of the compressor 51 and/or the opening degree of the expansion valve 53, which makes it easy to reduce the heat exchange efficiency deterioration.

9-13

The air treatment system 1 of the first embodiment includes each damper of each fan unit 30 attached to each duct 20, and a driving motor (an example of the actuator) for driving each damper. The main controller 40 controls to adjust the opening degrees of the plurality of dampers in order to prevent backflow, in the plurality of ducts 20, of the conditioned air flowing from the heat exchanger unit 10 toward the plurality of openings 71. As a result, it is possible to easily prevent reduction in heat exchange efficiency due to the backflow of the conditioned air in the plurality of ducts 20.

Alternatively, the air treatment system 1 includes each air deflector 74 of each blower unit 70 attached to each duct 20, and the air deflector motor 75 for driving each air deflector 74. The main controller 40 controls to adjust the opening degrees of the plurality of air deflectors 74 to prevent backflow, in the plurality of ducts 20, of the conditioned air flowing from the heat exchanger unit 10 toward the plurality of openings 71. As a result, it is possible to easily prevent reduction in heat exchange efficiency due to the backflow of the conditioned air in the plurality of ducts 20.

9-14

The air treatment system 1 of the first embodiment includes a plurality of fan motors 38 configured to change the amount of air supplied by each of the plurality of fan units 30. The air treatment system 1 controls the backflow of the conditioned air in each duct 20 by adjusting the rotation speed of each fan motor 38, which makes it easy to prevent reduction in heat exchange efficiency due to the backflow of the conditioned air in each duct 20.

(10) Modification to the Second Embodiment (10-1) Modification 2A

In the second embodiment, the description is given of the case where the fan motor 38 functions as an actuator for changing the amount of air supplied. However, the actuator for changing the amount of air supplied in the second embodiment is not limited to the fan motor 38. For example, the plurality of actuators may be the driving motor of the damper shown in FIG. 5. The fan motor 38 of the fan 32 shown in FIG. 5 may be a motor of a type capable of changing the rotation speed similar to that of the second embodiment, or may be a motor of a type incapable of changing the rotation speed. In a case where the fan motor 38 is the motor of a type incapable of changing the rotation speed, the amount of air supplied (air flow volume) from the fan unit 30 to the blower unit 70 is changed only by the damper, for example. On the other hand, in a case where the fan motor 38 is the motor of a type capable of changing the rotation speed, the amount of air supplied (air flow volume) from the fan unit 30 to the blower unit 70 is changed not only with change in the opening degree of the damper but with change in the rotation speed of the fan motor 38. In such a case, the fan controller 34 may be so configured to control both the driving motor and the fan motor 38 as the actuators.

In a case where the fan motor 38 is the motor of a type incapable of changing the rotation speed and the amount of air (air flow volume) supplied from the fan unit 30 to the blower unit 70 is changed only by the damper, a damper controller is provided instead of the fan controller 34. The main controller 40 sends the calculated amount of air supplied to the plurality of damper controllers as the target air supply amount. The main controller 40 sends, for example, the target air supply amount of the fan units 30a to 30d to the damper controllers attached to the fan units 30a to 30d. The target air supply amount of the fan units 30a to 30d is a command concerning the amount of air supplied by the fan unit 30. In other words, the main controller 40 sends a plurality of commands to the plurality of damper controllers for controlling the fan units 30a to 30d. The damper controllers of the fan units 30a to 30d control the opening degrees of the dampers to bring the amount of air supplied closer to the target air supply amount.

More specifically, for example, the damper controller of each of the fan units 30a to 30d compares volume of air (amount of air supplied) passing through the fan unit 30a detected by the differential pressure sensor 121 of each of the fan units 30a to 30d with the target air flow volume (target air supply amount). In a case where the volume of the air passing through the fan units 30a to 30d is smaller than the target air flow volume, the damper controller of each of the fan units 30a to 30d increases the opening degree of the damper with the driving motor and increases the air flow volume (amount of air supplied) of the fan units 30a to 30d to bring the air flow volume closer to the target air flow volume. Conversely, in a case where the volume of the air passing through the fan units 30a to 30d is greater than the target air flow volume, the opening degrees of the dampers are reduced by the driving motors and reduce the air flow volume (amount of air supplied) of the fan units 30a to 30d to bring the air flow volume closer to the target air flow volume.

For example, the plurality of actuators may be the air deflector motor 75. The fan motor 38 of the fan 32 may be a motor of a type capable of changing the rotation speed similar to that of the second embodiment, or may be a motor of a type incapable of changing the rotation speed. In a case where the fan motor 38 is the motor of a type incapable of changing the rotation speed, the amount of air supplied (air flow volume) from the fan unit 30 to the blower unit 70 is changed by both or any one of the damper and the air deflector 74, for example. On the other hand, in a case where the fan motor 38 is the motor of a type capable of changing the rotation speed, the amount of air supplied (air flow volume) from the fan unit 30 and the blower unit 70 to the air conditioned space TS is changed not only with change in the opening degree of both or any one of the damper and the air deflector 74 but with change in the rotation speed of the fan motor 38.

In a case where the fan motor 38 is the motor of a type incapable of changing the rotation speed and the amount of air (air flow volume) supplied from the fan unit 30 to the blower unit 70 is changed only by the air deflector 74, an air deflector controller is provided instead of the fan controller 34. The main controller 40 sends the calculated amount of air supplied to the plurality of air deflector controllers as the target air supply amount. The main controller 40 sends, for example, the target air supply amount of the fan units 30a to 30d to the air deflector controllers attached to the fan units 30a to 30d. The target air supply amount of the fan units 30a to 30d is a command concerning the amount of air supplied by the fan units 30a to 30d. In other words, the main controller 40 sends a plurality of commands to the plurality of air deflector controllers for controlling the fan units 30a to 30d. The air deflector controllers of the fan units 30a to 30d control the opening degrees of the air deflectors 74 to bring the amount of air supplied closer to the target air supply amount.

More specifically, for example, the air deflector controller of each of the fan units 30a to 30d compares volume of air (amount of air supplied) passing through the fan unit 30a detected by the differential pressure sensor 121 of each of the fan units 30a to 30d with the target air flow volume (target air supply amount). In a case where the volume of the air passing through the fan units 30a to 30d is smaller than the target air flow volume, the air deflector controller of each of the fan units 30a to 30d increases the opening degree of the air deflector 74 with the air deflector motor 75 and increases the air flow volume (amount of air supplied) of the fan units 30a to 30d to bring the air flow volume closer to the target air flow volume. Conversely, in a case where the volume of the air passing through the fan units 30a to 30d is greater than the target air flow volume, the opening degree of the air deflector 74 are reduced by the air deflector motors 75 and reduces the air flow volume (amount of air supplied) of the fan units 30a to 30d to bring the air flow volume closer to the target air flow volume.

(11) Additional Description of the Modifications and the Second Embodiment 11-1

The air treatment system 1 of the second embodiment has characteristic similar to those of the first embodiment described above in (9-1).

11-2

The controller 400 of the second embodiment controls a plurality of actuators in accordance with a plurality of commands concerning the amount of air supplied by the plurality of fan units 30a to 30d. The actuator of the second embodiment is at least one of the fan motor 38, the driving motor, and the air deflector motor 75. Such control enables the air treatment system 1 to adjust the volume of air passing through the use side heat exchanger 11 for efficient heat exchange in the use side heat exchanger 11, leading to the reduction in energy consumption of the air treatment system 1. In the second embodiment, at least one of the plurality of fan controllers 34, the plurality of damper controllers, and the plurality of air deflector controllers of the controller 400 controls the plurality of actuators.

11-3

The controller 400 of the air treatment system 1 of the second embodiment includes the main controller 40 for sending a plurality of commands and at least one sub-controller for receiving the plurality of commands from the main controller 40. Examples of the sub controller of the second embodiment include the fan controller 34, the damper controller, and the air deflector controller. At least one sub-controller controls the plurality of actuators on the basis of the plurality of commands. For example, in a case where the plurality of actuators is only the plurality of fan motors 38, the fan controllers 34 and the fan motors 38 may be provided in a one-to-one correspondence. Alternatively, the plurality of fan motors 38 may be provided so as to correspond to one fan controller 34. In such an air treatment system 1, since the main controller 40 controls the plurality of actuators through at least one sub controller, the control by the main controller 40 is simplified to facilitate the duct design and the layout change in the system.

11-4

In the air treatment system 1 of the second embodiment, each of the plurality of fan units 30a to 30d includes the differential pressure sensor 121 or a wind speed sensor that is an air flow volume detection unit for detecting volume of air passing through the unit. Each of the plurality of sub-controllers controls the rotation speed of the fan motors 38a to 33d in a manner to bring the air flow volume detected by the air flow volume detection unit closer to the amount of air supplied instructed by the controller 400. This allows the controller 400 to reliably control the amount of air supplied by the fan units 30a to 30d.

11-5

In the air treatment system 1 of the second embodiment, the controller 400 calculates the amount of air supplied by each of the fan units 30a to 30d on the basis of the temperature difference between the indoor air temperature to be adjusted by each of the plurality of fan units 30a to 30d and the set temperature and air flow temperature, and determines a plurality of commands on the basis of the calculated amount of air supplied. This allows the air treatment system 1 to easily control the temperature of the air conditioned space TS by changing the amount of air supplied.

(12) Modification to the Third Embodiment (12-1) Modification 3A

In the third embodiment, the description is given of the case where the main controller 40 determines the output of the blower 29 in such a manner that, among the plurality of fans 32, the rotation speed of a fan with the highest fan efficiency is the maximum.

However, another configuration is possible in which the main controller 40 determines the output of the blower 29 in such a manner that, among the plurality of fans 32, the rotation speed of a fan with the lowest fan efficiency is the minimum. In such a case, for each of the fan units 30 other than the fan unit 30 with the lowest fan efficiency, the corresponding fan controller 34 adjusts the rotation speed of the fan 32. The rotation speed of the plurality of fans 32 is adjusted independently of one another.

Figure 15:
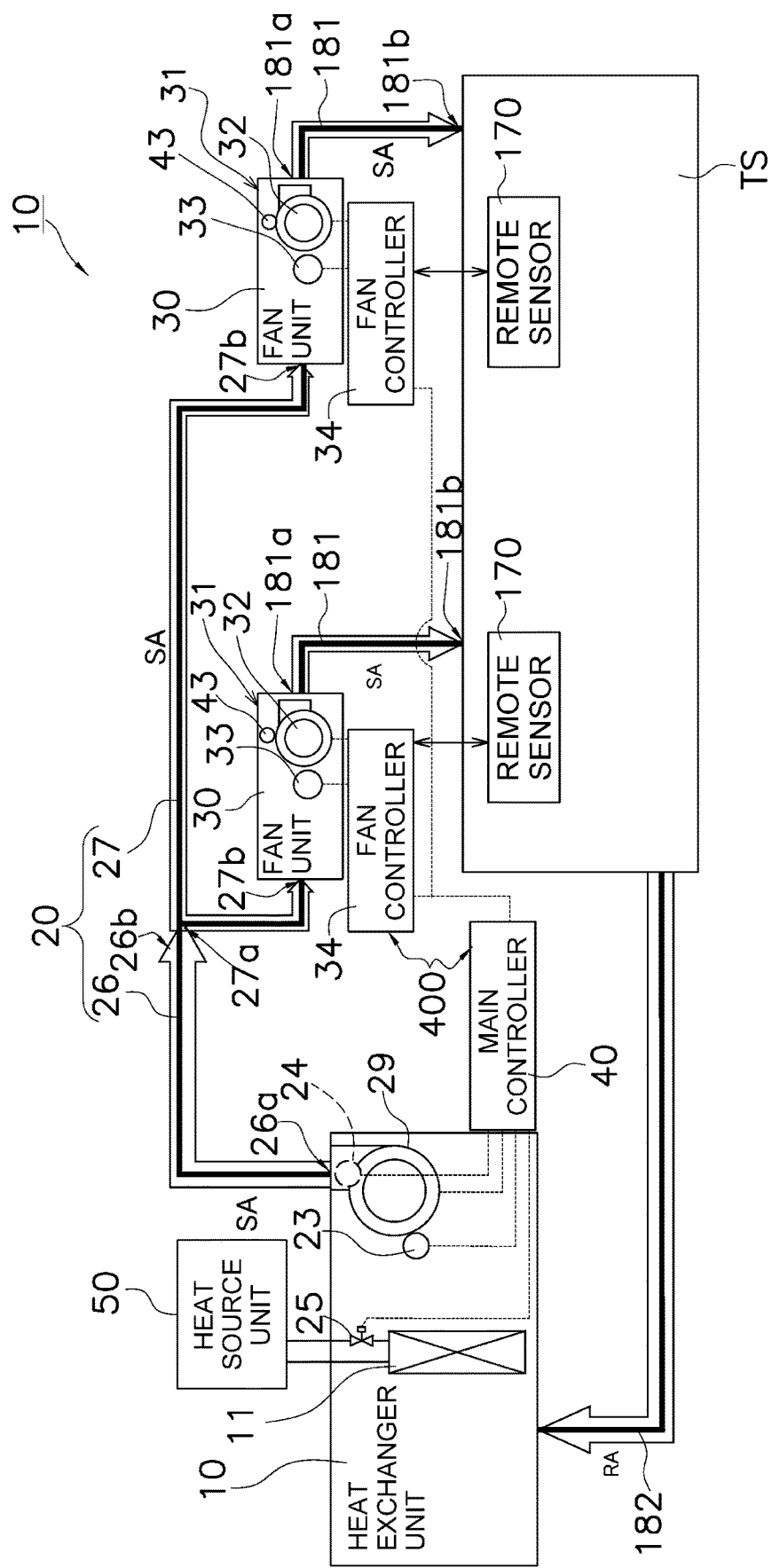
FIG. 15 is a conceptual diagram showing an example of the configuration of an air conditioning system according to a modification of the third embodiment.

Further, in a case where the main controller 40 reduces the target air flow volume, the main controller 40 may be configured to determine the output of the blower 29 so that the treatment static pressure of the fan with the highest fan efficiency among the plurality of fans 32 is constant. With such a configuration, the fan unit 30 having a constant treatment static pressure among the fan units 30 can keep the rotation speed of the fan 32 higher in efficiency than the others, so that the entire efficiency of the air treatment system 1 can be kept high. As described above, in the case of using the configuration in which the treatment static pressure is kept constant, for example, each fan unit 30 is configured to include a differential pressure sensor 43 (see FIG. 15) for detecting the treatment static pressure of the fan 32. Alternatively, the controller 400 is so configured as to calculate the treatment static pressure on the basis of the detection result of the air flow volume detection unit 33 and the rotation speed of the fan 32. The controller 400 determines the output of the blower 29 on the basis of the detected value of the differential pressure sensor 43 of the fan unit 30 with the highest fan efficiency. In such a case, for each of the fan units 30 other than the fan unit 30 with the treatment static pressure kept at constant, the corresponding fan controller 34 adjusts the rotation speed of the fan 32. The rotation speed of the plurality of fans 32 is adjusted independently of one another.

Further, in a case where the main controller 40 increases the target air flow volume, the main controller 40 may be configured to determine the output of the blower 29 so that the treatment static pressure of the fan with the lowest fan efficiency among the plurality of fans 32 is constant. With such a configuration, the fan unit 30 having a constant treatment static pressure among the fan units 30 can keep the rotation speed of the fan 32 lower in efficiency than the others, so that the entire efficiency of the air treatment system 1 can be kept high. As described above, in the case of using the configuration in which the treatment static pressure is kept constant, for example, each fan unit 30 is configured to include a differential pressure sensor 43 (see FIG. 15) for detecting the treatment static pressure of the fan 32. Alternatively, the controller 400 is so configured as to calculate the treatment static pressure on the basis of the detection result of the air flow volume detection unit 33 and the rotation speed of the fan 32. The controller 400 determines the output of the blower 29 on the basis of the detected value of the differential pressure sensor 43 of the fan unit 30 with the lowest fan efficiency. In such a case, for each of the fan units 30 other than the fan unit 30 with the treatment static pressure kept at constant, the corresponding fan controller 34 adjusts the rotation speed of the fan 32. The rotation speed of the plurality of fans 32 is adjusted independently of one another.

(12-2) Modification 3B

In the third embodiment, the description is given of the case where the remote sensor 170 includes a temperature sensor, however, the remote sensor 170 may have, for example, a function of at least one of a temperature sensor, a $CO_2$ concentration sensor, and a humidity sensor. With this configuration, each of the plurality of fan controllers 34 receives at least one detected value of the temperature, the $CO_2$ concentration, and the humidity of the air conditioned space TS from the remote sensor 170 connected to the fan controllers 34. Each fan controller 34 holds data on a set value of a detection target of the remote sensor 170. Each fan controller 34 sends a set value of at least one of the temperature, the $CO_2$ concentration, and the humidity to the main controller 40. The main controller 40 determines a target air flow volume of each fan unit 30 according to the value detected by the corresponding remote sensor 170 on the basis of the set value. The main controller 40 sends a value of the target air flow volume to each fan controller 34.

(12-3) Modification 3C

In the third embodiment, the description is given of the case where the heat exchanger unit 10 includes the use side heat exchanger 11. However, another configuration is possible in which the heat exchanger unit 10 does not have the use side heat exchanger 11. The air treatment system 1 may be configured as, for example, a system to ventilate the air conditioned space TS when the $CO_2$ concentration in the air conditioned space TS is high.

(12-4) Modification 3D

Figure 7:
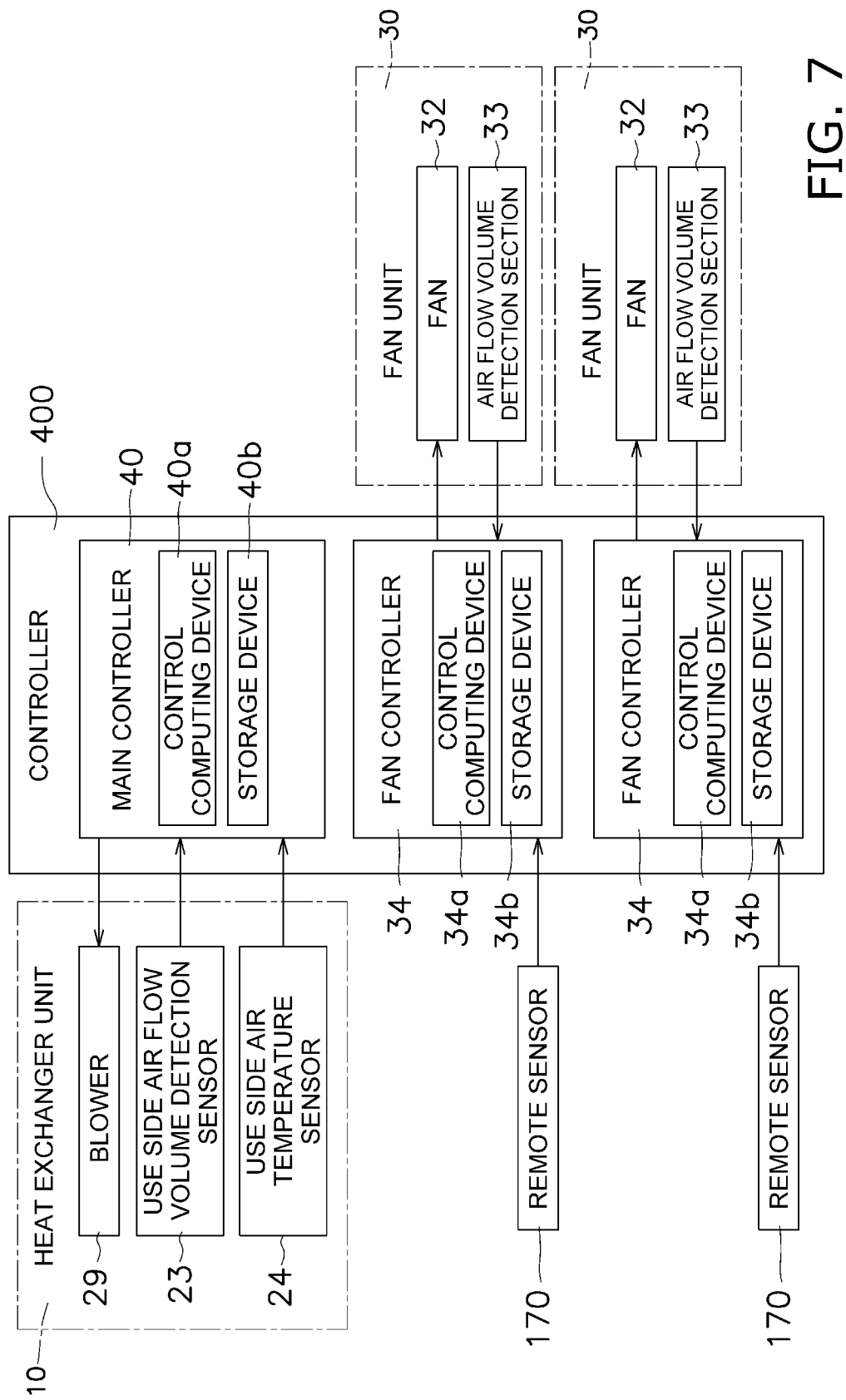
FIG. 7 is a block diagram for explaining the configuration of a controller of the third embodiment.

The controller 400 is implemented by a computer. The controller 400 includes control computing devices 40a and 34a and storage devices 40b and 34b. The control computing devices 40a and 34a each may be a processor such as a CPU or a GPU. The control computing devices 40a and 34a read out a program stored in the storage devices 40b and 34b and perform predetermined image processing and computing processing in accordance with the program. Further, the control computing devices 40a and 34a can write an computing result to the storage devices 40b and 34b and read out information stored in the storage devices 40b and 34b in accordance with the program. FIGS. 7 and 17 are diagrams showing various functional blocks controlled by the control computing devices 40a and 34a of the air treatment system of FIGS. 6 and 16. The storage devices 40b and 34b can be used as databases.

(12-5) Modification 3E

Figure 16:
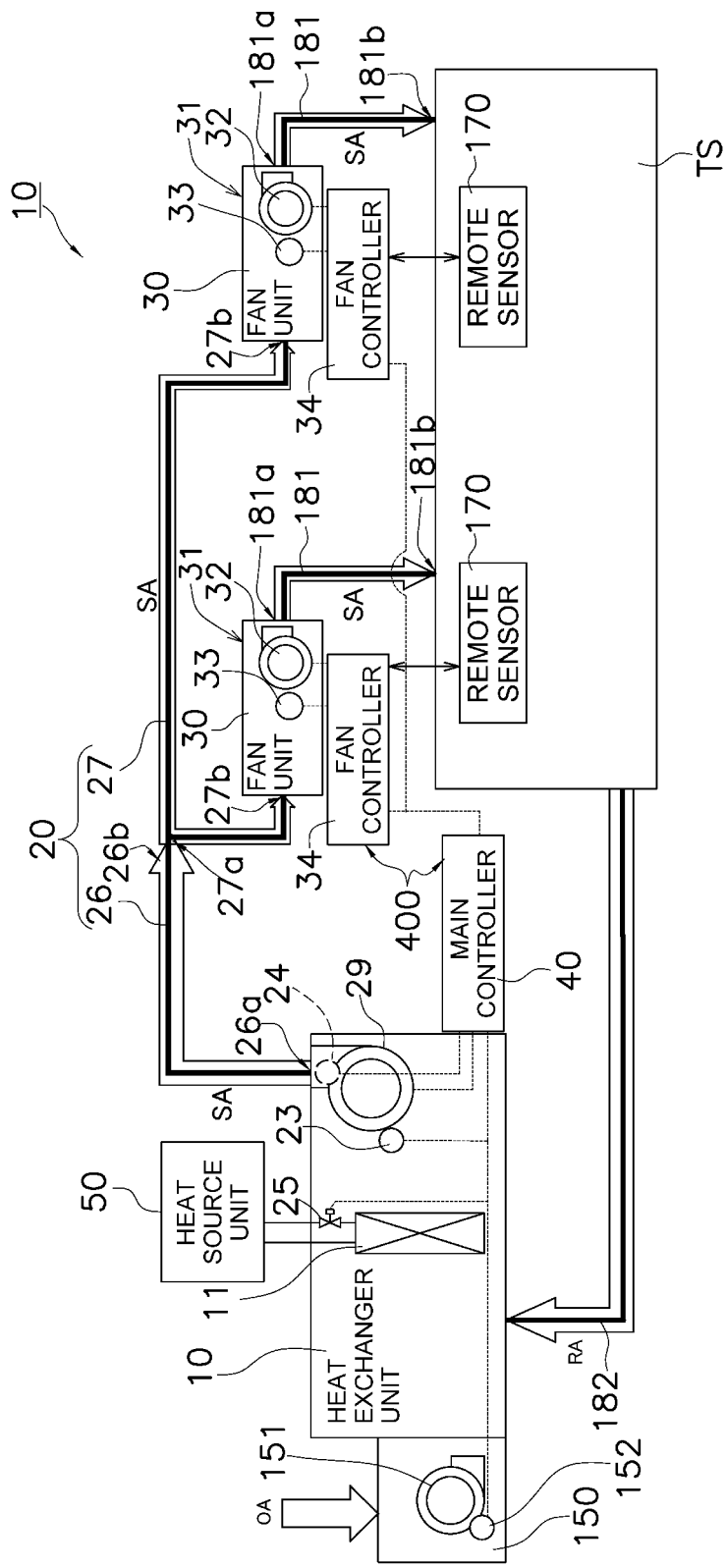
FIG. 16 is a block diagram for explaining the configuration of a controller in FIG. 15.
Figure 17:
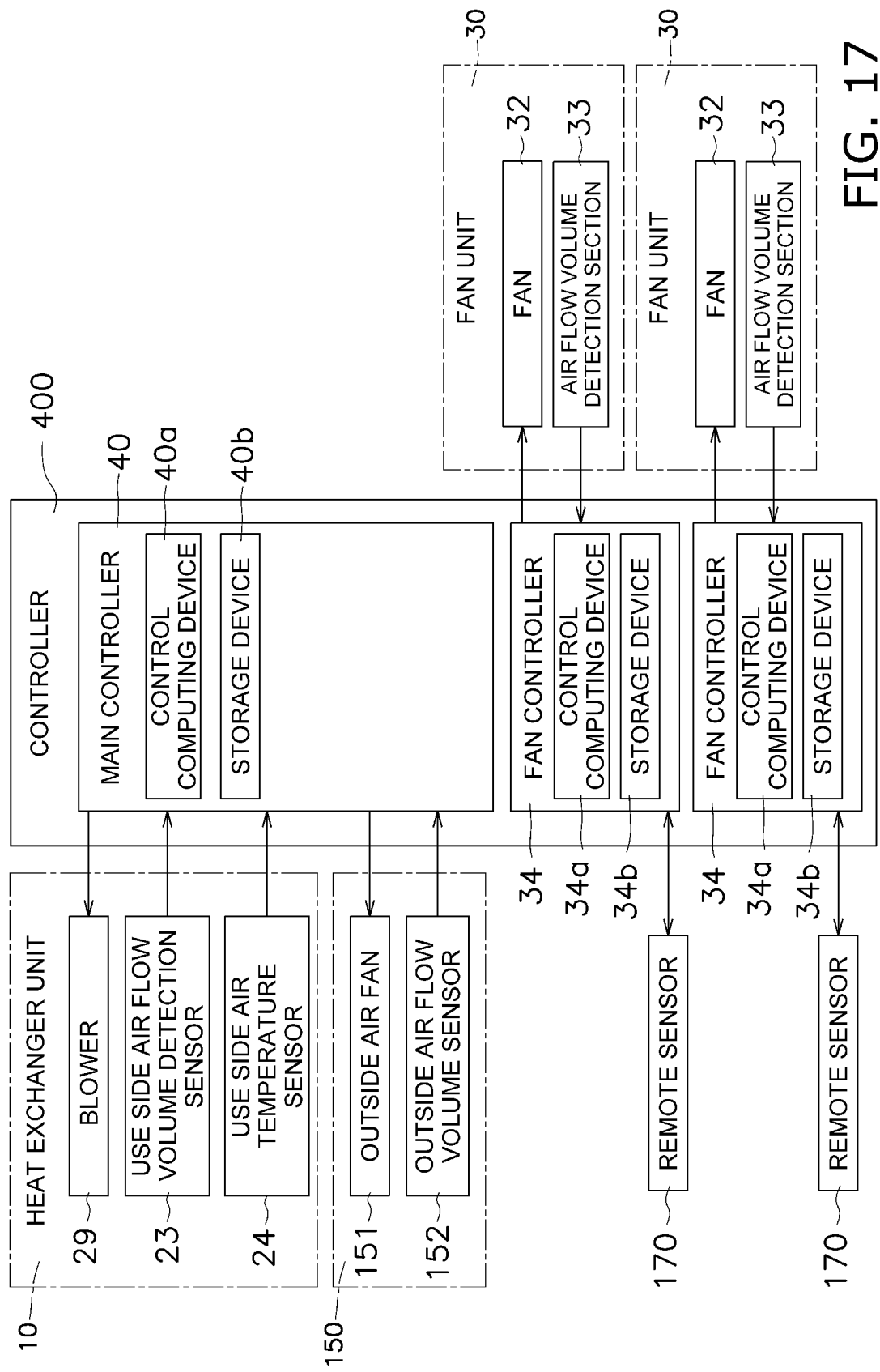
FIG. 17 is a conceptual diagram showing another example of the configuration of an air conditioning system according to a modification of the third embodiment.

As shown in FIGS. 16 and 17, an outside air introduction unit 150 may be attached to the heat exchanger unit 10. The outside air introduction unit 150 includes an outside air fan 151 and an outside air flow volume sensor 152. The outside air introduction unit 150 takes in outside air OA from the outside of the air conditioned space TS with the outside air fan 151 and sends air to the heat exchanger unit 10. The outside air flow volume sensor 152 detects amount of air blowing of the outside air OA sent to the heat exchanger unit 10. The outside air flow volume sensor 152 sends a value of the detected amount of air blowing of the outside air OA to the main controller 40. A configuration is possible in which, in the case where the outside air introduction unit 150 sends the outside air OA to the heat exchanger unit 10, the main controller 40 performs correction according to the air flow volume of the outside air OA with respect to the control over the output of the blower 29. The outside air flow volume sensor 152 may be, for example, an air flow volume sensor, a wind speed sensor, or a differential pressure sensor.

(13) Additional Description of the Modification and the Third Embodiment 13-1

In the air treatment system 1 of the third embodiment, the controller 400 controls the output of the blower 29 to an appropriate value in accordance with the total of supply air volume to be supplied to the air conditioned space TS. The total of supply air volume is an example of the amount of air supplied by the plurality of fans 32. Such control of the controller 400 enables the air treatment system 1 to reduce the energy consumption of the entire system.

13-2

In the air treatment system 1 of the third embodiment, the heat exchanger unit 10 can exchange heat with the heating medium in the use side heat exchanger 11 and send conditioned air to the plurality of fan units 30. The plurality of fan units 30 can use the conditioned air to perform air conditioning in the air conditioned space TS.

13-3

The controller 400 of the air treatment system 1 determines the air flow volume of the air supplied by the plurality of fan units 30 according to at least one of the temperature, the humidity, and the $CO_2$ concentration of the air conditioned space TS to control the air flow volume of each of the plurality of fan units 30. In such an air treatment system 1, the controller 400 can control the air flow volume of each of the plurality of fan units 30 to keep at least one of the temperature, the humidity, and the $CO_2$ concentration of the air conditioned space TS to an appropriate range.

13-4

The air treatment system 1 may be so configured that, when changing the operating state of at least one fan 32 among the plurality of fans 32 or the air flow volume of at least one fan 32 among the plurality of fans 32, the controller 400 gives priority to increasing the output of a fan with high fan efficiency or reducing the output of a fan with low fan efficiency among the blower 29 and the plurality of fans 32. In the air treatment system 1 configured as described above, the controller 400 controls the output of the fan with high fan efficiency to be preferentially increased or the output of the fan with low fan efficiency to be decreased, leading to the reduction in energy consumption of the air treatment system 1.

13-5

The air treatment system 1 can be so configured that the controller 400 determines the output of the blower 29 so that the treatment static pressure of the fan 32 with the highest fan efficiency among the plurality of fans 32 becomes constant or the rotation speed of the fan 32 with the highest fan efficiency among the plurality of fans 32 becomes maximum, so that the output of the fan 32 with low fan efficiency can be reduced preferentially. In such a configuration, as a result of the preferentially reducing the output of the fan 32 with low fan efficiency, the energy consumption can be reduced as compared with the case of reducing the output of the fan 32 with higher fan efficiency.

13-6

The air treatment system 1 can be so configured that the controller 400 determines the output of the blower 29 so that the treatment static pressure of the fan 32 with the lowest fan efficiency among the plurality of fans 32 becomes constant or the rotation speed of the fan 32 with the lowest fan efficiency among the plurality of fans 32 becomes minimum, so that the output of the fan 32 with high fan efficiency can be increased preferentially. In such a configuration, as a result of the preferentially increasing the output of the fan 32 with high fan efficiency, the energy consumption can be reduced as compared with the case of increasing the output of the fan 32 with lower fan efficiency.

13-7

In the air treatment system 1, the controller 400 increases the output of the blower 29 if the air flow volume of the fan with the maximum fan efficiency among the plurality of fans 32 does not reach the target air flow volume. In the air treatment system 1 configured as described above, the controller 400 can increase the output of the blower 29 and perform control so that the air flow volume of the fan with the maximum fan efficiency among the plurality of fans 32 reaches the target air flow volume.

The embodiment of the present disclosure has been described above. Various modifications to modes and details should be available without departing from the object and the scope of the present disclosure recited in the claims.

REFERENCE SIGNS LIST

1: Air treatment system
10: Heat exchanger unit (example of air treatment unit)
30: Fan unit
31: Unit casing
32: Fan
33: Air flow volume detection unit
34: Fan controller (example of control unit)
39: Fan casing
60: Remote controller
300: Fan unit system

CITATIONS LIST

Patent Literature

Patent Literature 1: JP 2001-304614 A

The invention claimed is:
1. An air treatment system for applying predetermined treatment to air to be supplied to an air conditioned space, the air treatment system comprising:
a plurality of fan units that are capable of changing air flow volume of air to be supplied to the air conditioned space;
an air treatment unit that is connected to the plurality of fan units by a corresponding plurality of ducts, and includes a blower that sends treated air that has been subjected to predetermined treatment through the plurality of ducts to the corresponding plurality of fan units; and
a main controller, wherein
the air treatment unit includes
a use side air flow volume detection sensor that is connected to the main controller and detects air flow volume of the air sent by the blower through the plurality of ducts; and
a use side air temperature sensor that is connected to the main controller and detects a temperature of the air sent from the blower to the plurality of ducts,
each of the plurality of fan units includes
a fan with variable rotation speed;

an air flow volume detector that detects air flow volume of the fan or equivalent air flow volume that is a physical quantity corresponding to the air flow volume of the fan;

a unit casing that fully encloses the fan and the air flow volume detector, and has an intake port connected to one of the plurality of ducts, the air flow volume detector detecting the air flow passing through the unit casing via the intake port; and a controller that controls a rotation speed of the fan, wherein the main controller sends a command value of air flow volume to the controller of each of the plurality of fan units, the controller of each of the plurality of fan units controls the rotation speed of the fan on a basis of a command value of the flow volume of the fan given from the main controller and a detected value of the air flow volume or the equivalent air flow volume detected by the air flow volume detector, the controller of each of the plurality of fan units controls the rotation speed of the fan so that the air flow volume indicated in the detected value approaches the command value, the controller of each of the plurality of fan units reduces the rotation speed of the fan in a first operation in which the air flow volume indicated in the detected value is greater than the command value, and the controller of each of the plurality of fan units increases the rotation speed of the fan in a second operation in which the air flow volume indicated in the detected value is smaller than the command value.

2. The air treatment system according to claim 1, wherein in each of the plurality of fan units,
the fan is a centrifugal fan,
the centrifugal fan includes a fan casing, and
the fan casing is housed in the unit casing.

3. The air treatment system according to claim 1, wherein in each of the plurality of fan units,
the air flow volume detector includes at least one of a wind speed sensor for detecting a wind speed at a predetermined location in the unit casing, a pressure sensor for detecting a static pressure in the unit casing, a differential pressure sensor for detecting a differential pressure at a predetermined location in the unit casing, and an air flow volume sensor for detecting air flow volume of the fan.

4. The air treatment system according to claim 2, wherein in each of the plurality of fan units,
the air flow volume detector includes at least one of a wind speed sensor for detecting a wind speed at a predetermined location in the unit casing, a pressure sensor for detecting a static pressure in the unit casing, a differential pressure sensor for detecting a differential pressure at a predetermined location in the unit casing, and an air flow volume sensor for detecting air flow volume of the fan.

5. The air treatment system according to claim 1, further comprising
a duct including a main pipe connected to the air treatment unit and a branch pipe that branches off from the main pipe, wherein
each of the plurality of fan units is connected to each of the plurality of branch pipes.

6. The air treatment system according to claim 5, further comprising:
a plurality of indoor temperature sensors that detects a temperature of the air conditioned space; and
a plurality of remote controllers that inputs a set temperature of the air conditioned space, wherein
each of the plurality of fan units is associated with each of the plurality of indoor temperature sensors and each of the plurality of remote controllers, and
the main controller determines, on a basis of the set temperature of the plurality of remote controllers, the command value of the plurality of fan units according to an indoor temperature detected by the plurality of indoor temperature sensors.

7. The air treatment system according to claim 1, further comprising:
a plurality of indoor temperature sensors that detects a temperature of the air conditioned space; and
a plurality of remote controllers that inputs a set temperature of the air conditioned space, wherein
each of the plurality of fan units is associated with each of the plurality of indoor temperature sensors and each of the plurality of remote controllers, and
the main controller determines, on a basis of the set temperature of the plurality of remote controllers, the command value of the plurality of fan units according to an indoor temperature detected by the plurality of indoor temperature sensors.

8. The air treatment system according to claim 2, further comprising
a duct including a main pipe connected to the air treatment unit and a branch pipe that branches off from the main pipe, wherein
each of the plurality of fan units is connected to each of the plurality of branch pipes.

9. The air treatment system according to claim 3, further comprising
a duct including a main pipe connected to the air treatment unit and a branch pipe that branches off from the main pipe, wherein
each of the plurality of fan units is connected to each of the plurality of branch pipes.

* * * * *